(12) United States Patent
Evans

(10) Patent No.: US 10,531,165 B1
(45) Date of Patent: *Jan. 7, 2020

(54) EMBEDDED CONTENT SYNCHRONIZATION

(71) Applicant: Amazon Technologies, Inc., Seattle, WA (US)

(72) Inventor: Ethan Zane Evans, Sumner, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,176

(22) Filed: Dec. 11, 2017

(51) Int. Cl.
H04N 21/8547 (2011.01)
H04N 21/234 (2011.01)
H04N 21/435 (2011.01)
H04N 21/44 (2011.01)
H04N 21/235 (2011.01)

(52) U.S. Cl.
CPC ....... *H04N 21/8547* (2013.01); *H04N 21/234* (2013.01); *H04N 21/235* (2013.01); *H04N 21/435* (2013.01); *H04N 21/44* (2013.01)

(58) Field of Classification Search
None
See application file for complete search history.

(56) References Cited

U.S. PATENT DOCUMENTS

| 5,423,555 | A | 6/1995 | Kidrin | |
|---|---|---|---|---|
| 7,632,186 | B2 * | 12/2009 | Spanton | A63F 13/12 463/40 |
| 9,578,351 | B1 * | 2/2017 | Bynoe | G06F 17/30837 |
| 9,628,863 | B2 * | 4/2017 | Ma | H04N 7/147 |
| 9,712,569 | B2 | 7/2017 | Vashishtha et al. | |
| 2002/0103919 | A1 * | 8/2002 | Hannaway | H04N 21/23406 709/231 |
| 2002/0188959 | A1 * | 12/2002 | Piotrowski | H04N 5/4401 725/112 |
| 2003/0227567 | A1 | 12/2003 | Plotnick et al. | |
| 2004/0116183 | A1 * | 6/2004 | Prindle | A63F 13/12 463/42 |

(Continued)

OTHER PUBLICATIONS

U.S. Appl. No. 15/838,139; Non-Final Office Action; dated Jun. 8, 2018; 22 pages.

(Continued)

*Primary Examiner* — Jason K Lin
(74) *Attorney, Agent, or Firm* — BakerHostetler

(57) ABSTRACT

In combination with video content transmitted by a video streaming service, additional content may also be displayed to viewers. The video content may be displayed in a video player display, while the additional content may be displayed in an additional content area, such as an inline frame. In some examples, the display of the video content and the additional content may be synchronized such that portions of video content are displayed along with corresponding related portions of additional content. The additional content area may also receive user input. In some examples, the user input may be provided back to a source of the video content, such as a video game that generated the video content. In some examples, timing information may also be provided along with the user input, such as a time associated with a simultaneously displayed portion of video content.

20 Claims, 20 Drawing Sheets

(56) References Cited

U.S. PATENT DOCUMENTS

| | | |
|---|---|---|
| 2007/0124756 A1 | 5/2007 | Covell et al. |
| 2007/0214426 A1 | 9/2007 | Ruelle et al. |
| 2010/0229113 A1 | 9/2010 | Conner |
| 2010/0269030 A1 | 10/2010 | Dugonjic et al. |
| 2011/0230267 A1 | 9/2011 | Van Luchene |
| 2013/0013318 A1 | 1/2013 | Huang et al. |
| 2013/0312041 A1 | 11/2013 | Gresta |
| 2014/0024459 A1* | 1/2014 | Solomon .............. A63F 13/45 463/42 |
| 2014/0053223 A1* | 2/2014 | Vorobyov ............. G10L 13/00 725/110 |
| 2014/0325565 A1* | 10/2014 | Mangat .............. H04N 21/4316 725/43 |
| 2014/0337093 A1 | 11/2014 | Jain |
| 2015/0099249 A1 | 4/2015 | Norman et al. |
| 2015/0296242 A1 | 10/2015 | Khalil et al. |
| 2016/0228776 A1* | 8/2016 | Miura ................... A63F 13/12 |
| 2016/0269771 A1* | 9/2016 | Bangma .......... H04N 21/23106 |
| 2017/0232340 A1* | 8/2017 | Lockton ............. H04L 65/4076 463/42 |
| 2018/0035145 A1* | 2/2018 | Grubbs ............. H04N 21/2662 |

OTHER PUBLICATIONS

U.S. Appl. No. 15/826,384, filed Nov. 29, 2017, Bartlett et al.
U.S. Appl. No. 15/826,317, filed Nov. 29, 2017, Humphreys e al.
U.S. Appl. No. 15/838,139, filed Dec. 11, 2017, Evans.
West, Matt; "Cross-Domain Messaging with postMessage"; http://blog.teamtreehouse.com/cross-domain-messaging-with-postmessage; Treehouse Island, Inc.; Sep. 2013; 11 pages.
U.S. Appl. No. 15/838,139; Final Office Action; dated Dec. 10, 2018; 32 pages.
U.S. Appl. No. 15/838,139; Notice of Allowance; dated Apr. 18, 2019; 10 pages.
U.S. Appl. No. 15/826,384; Non-Final Office Action; dated Jun. 20, 2019; 7 pages.
U.S. Appl. No. 15/826,384; Final Office Action; dated Oct. 2, 2019; 9 pages.

* cited by examiner

Table 1010
Example times for:
Additional Content Delivery = 2 sec
Video Content Delivery = 10 sec

| Description 1000 | Additional Content Timestamp 1001 | Video Content Timestamp 1002 | Additional Content Receipt Time 1003 | Video Content Receipt Time 1004 | Combined Content Display Time 1005 |
|---|---|---|---|---|---|
| Home Plate | 001 | 001 | 003 | 011 | 011 |
| First Base | 009 | 009 | 011 | 019 | 019 |
| Second Base | 017 | 017 | 019 | 027 | 027 |

FIG. 10

Table 1210
Example times for:
Additional Content Delivery = 2 sec
Video Content Delivery = 10 sec

| Description 1000 | Additional Content Timestamp 1001 | Video Content Timestamp 1002 | Additional Content Receipt Time 1003 | Video Content Receipt Time 1004 | Combined Content Display Time 1005 | User Input Timing Information 1200 |
|---|---|---|---|---|---|---|
| Home Plate | 001 | 001 | 003 | 011 | 011 | 001 |
| First Base | 009 | 009 | 011 | 019 | 019 | 009 |
| Second Base | 017 | 017 | 019 | 027 | 027 | 017 |

FIG. 12

EMBEDDED CONTENT SYNCHRONIZATION

BACKGROUND

The popularity of video streaming has increased rapidly in recent years. In some examples, video content may be captured by a video content provider and transmitted to a video streaming service. The video streaming service may then, in turn, transmit the video to a number of viewers. In some cases, the video may correspond to an event, such as a video game, a news event, a sporting event, or another live event. In one specific example, a video content provider may be a video game player that captures and transmits video of a game that he or she is playing. In some examples, the video content may be transmitted to viewers and played using live streaming techniques. For example, video of an event may be transmitted to viewers and played while the event is still occurring, albeit with some latency between the time that video is captured by the provider and the time that the video is eventually played to viewers. In some examples, the video streaming service may provide many different available video streams, and subscribers of the video streaming service may select one or more of the available video streams for viewing.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 10 is a diagram illustrating first example timing information that may be used in accordance with the present disclosure.

FIG. 12 is a diagram illustrating second example timing information that may be used in accordance with the present disclosure.

DETAILED DESCRIPTION

Figure 1:
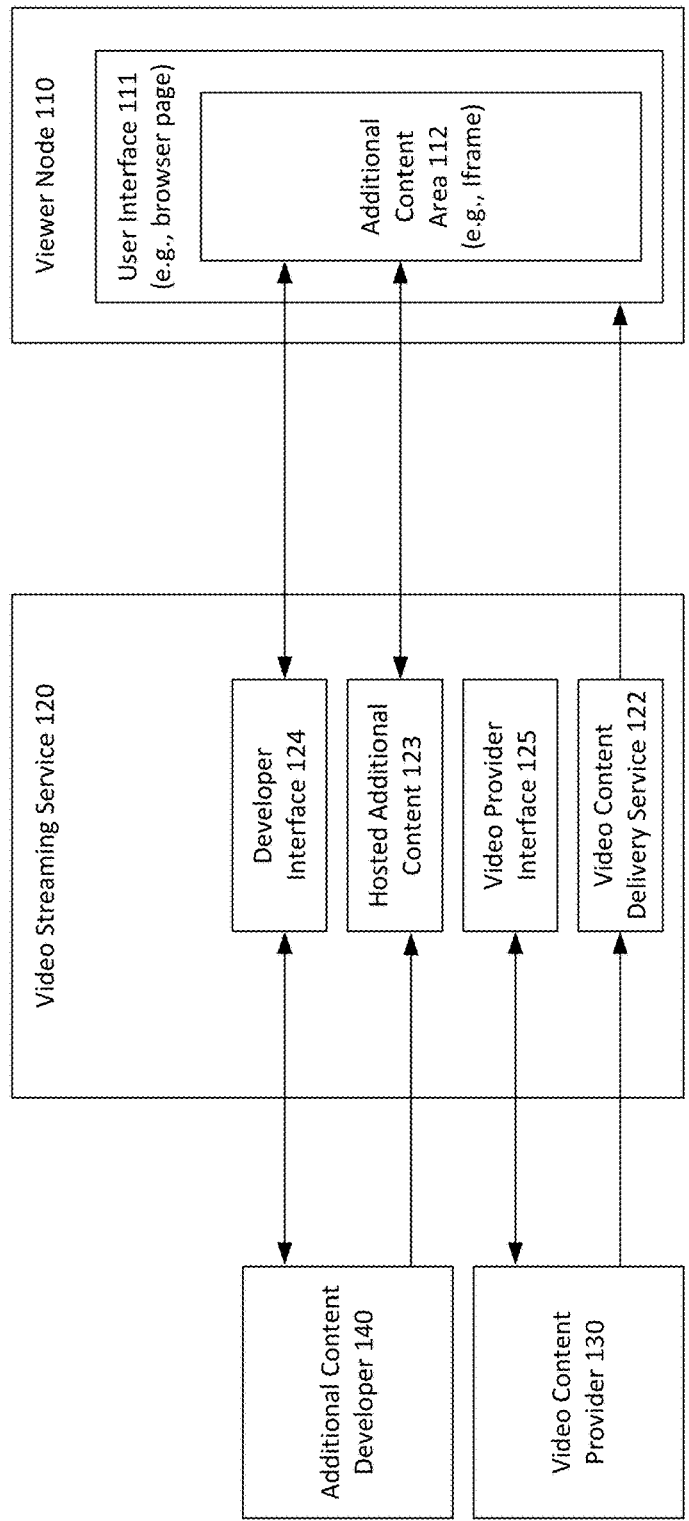
FIG. 1 is a diagram illustrating an example content delivery system that may be used in accordance with the present disclosure.

Various techniques for providing a video stream with additional content areas are described herein. In particular, in some examples, a stream of video content, for example corresponding to an event, such as a video game, may be transmitted to a number of viewers. In some examples, the video content may be provided by a video content provider and transmitted to a video streaming service. The video streaming service may then, in turn, transmit the video content to a number of viewers. For example, a video content provider may be a video game player that captures and transmits video of a game that he or she is playing. The video streaming service may, in turn, transmit the video of the game to a number of viewers.

In some examples, in combination with the video content transmitted by the video streaming service, the techniques described herein may allow additional content to be displayed to viewers. In some examples, the additional content may include information about the video game or other video content that is being streamed. In some examples, the additional content may include information that is generated, updated and displayed live in real-time or near real-time, such as to reflect current game or other video content states. Also, in some examples, the additional content may be interactive content that allows the viewer to provide input, such as to vote and/or wager on features of the video game or other video content. For example, for a video game, the viewer may be permitted to influence various features of the video game, even though the viewer may not be an actual game player. In some examples, the additional content may include live statistics, such as player and/or team statistics (e.g., wins, losses, kills, points, rankings, etc.), inventory, location information, timing information, game object information, and other statistics. Furthermore, in some examples, the additional content may include information about a particular feed or channel on which the video content is transmitted. For example, the additional information may include live statistics or other information about viewers of a particular channel and/or subscribers to a particular player's video feed. In yet other examples, the additional content may include a secondary video game that may be played by viewers of the primary video game displayed in the video content. Many other types of additional content may be provided in combination with a video content stream. In some examples, by enhancing the interactive nature of content that is presented to the viewer, the additional content may improve the viewer's experience and potentially attract new and more devoted viewers.

In some examples, the video streaming service may provide a framework that allows additional content, such as described above, to be provided by third parties (e.g., parties other than the video streaming service or the video content provider). By allowing third parties to develop and provide additional content, the range of interactions and experiences made available through such content may, in some cases, be significantly expanded. For example, as will be described in detail below, the video streaming service may allow third parties to submit the additional content, may host the additional content on behalf of the third parties, and may allow testing, review and release of the additional content. Additionally, the video streaming service may allow video content providers, such as video game players, to select which additional content is to be displayed in combination with their particular provided video content. For example, in some cases, a video content provider may browse available additional content and select particular additional content to embed on a respective channel, page or other interface on which the provider's video content is displayed. In some examples, providers may be able to add or remove additional content from their respective interface at any time, without requiring the interface to be refreshed by viewers in order for additional content to be added or removed.

In some examples, the additional content may include web-related content, such as hypertext markup language (HTML), JavaScript, Cascading Style Sheets (CSS), and other content. Additionally, in some examples, the additional content may be displayed inside a respective assigned area, such as an inline frame (Iframe), embedded within a web page or other interface in which the video content is displayed. For example, in some cases, the video content may be shown in a video player display that is included within an interface, such as a web page, provided by the video streaming service. In some examples, additional content may be displayed in an Iframe or other area that overlays the video player display. Additionally, in some examples, the additional content may be displayed in a different portion of the interface that is external to the video player display.

In some examples, certain types of user input may be provided by viewers, such as to control playing of the video content. For example, in some cases, certain keyboard keys, key combinations, and/or shortcuts may be input by users to provide various commands to the player, such as pause, un-pause, full screen, escape from full screen, mute, unmute, and others. When an area of additional content overlays a video player display, a viewer may provide input that causes focus to be assigned to the area of additional content. For example, a viewer may click on an area of additional content, such as to perform one or more actions (e.g., voting in a poll, etc.) within the area of additional content. One problem related to the display of additional content is that, when focus is provided to the additional content, user input that is intended for the player, such as the keyboard shortcuts described above, may not work. Thus, the techniques described herein may include various techniques for automatically returning focus back from an additional content area to a video player. In particular, in some examples, when a user provides input that causes focus to be assigned to an additional content area (e.g., Iframe), focus may be automatically returned to the video player upon performance of a respective action. In one specific example, a user may click into an area of additional content, such as to vote in a poll that is provided by the additional content. In some examples, upon performance of an action associated with the user input, focus may be automatically returned back the video player. Thus, if the user subsequently enters a keyboard shortcut, the keyboard shortcut input will be provided to the video player as opposed to the additional content. Thus, automatically returning focus to the video player may increase the likelihood that user input is provided to the content for which the input is intended, thereby improving the user experience.

Thus, as set forth above, a viewer interface may include both a video player display that displays video content and one or more additional content areas (e.g., Iframes) that display additional content. In some examples, particular portions of the additional content displayed in an additional content area may be related to corresponding particular portions of the video content displayed by the video player. In a specific example, a video player display may display video content from a video game, while an additional content area may display state data (e.g., statistics, etc.) from the video game. In this example, a particular portion of the state data may sometimes relate to one or more corresponding video frames that were generated at, or around, the same time as the state data, such as a video frame that was rendered based on the state data. For example, an additional content area may display location coordinates for a particular character in the video game. In this scenario, a portion of the additional content that includes a particular set of location coordinates may be related to a corresponding frame in which the character is positioned at those same location coordinates. If the character is moved and its location changes in one or more subsequent frames, then those same location coordinates will no longer be accurate for describing the character's new location in the subsequent frames.

One challenge associated with the display of video content and related additional content is that, in some examples, the additional content may be delivered to the viewer more quickly than the video content. In particular, in some examples, delivery of video content may include a number of steps, such as transmission of state data from a game server to a video content provider (e.g., video game player), rendering of the video content at the video content provider, capturing of the rendered video content at the video content provider, encoding and transmission of the video content from the video content provider to the video streaming service, and transcoding and re-transmission of the video content from the video streaming service to the viewer. By contrast, in some examples, state data may be transmitted from the video game server to the viewer, in some cases directly or through only a single intermediary (e.g., a third party developer service, etc.).

When the additional content is delivered to the viewer more quickly than the video content, a lack of synchronization between the additional content and the video content may result. For example, consider the scenario of a baseball video game in which an additional content area includes state data that describes a location of a baseball player character within the game. The baseball player may run from home plate to first base and then subsequently run from first base to second base. If, however, the player's location state data is delivered to the viewer more quickly than the video content, then the location data and the video content will be out of synchronization. For example, in some cases, when the viewer receives video content showing the player at home plate, the viewer may be simultaneously receiving state data indicating that the player is at first base. As another example, when the viewer subsequently receives video content showing the player at first base, the viewer may be simultaneously receiving state data indicating that the player is at second base.

In some examples, such as in order to re-synchronize display of the additional content and the video content, the viewer node may, upon receipt of additional content, delay the display of the additional content. For example, in some cases, the viewer node may delay display of a portion of additional content until a corresponding related portion of video content, such as one or more related video frames, are received and displayed. For example, continuing with the baseball video game scenario described above, the viewer node may receive state data indicating that the baseball player is at first base. However, the viewer node may not immediately display this state data. Instead, the viewer node may delay display of this state data until it receives and displays the corresponding video content showing that the player is at first base. Similarly, when the viewer node receives subsequent state data indicating that the baseball player is at second base, the viewer node may again delay display of this state data until it receives and displays the corresponding video content showing that the player is at second base.

In some examples, both portions (e.g., video frames) of the video content and portions of the additional content may be assigned timestamps. Additionally, in some examples, the timestamps may be synchronized such that a timestamp assigned to a particular portion of additional content may match a timestamp assigned to a corresponding related portion of video content. In this scenario, when the viewer node receives a particular portion of additional content, the viewer node may identify the timestamp assigned to that portion of the additional content. The viewer node may then delay display of that portion of the additional content until it receives and displays a portion of video content that includes the same timestamp as was assigned to the portion of the additional content. In this manner, the viewer node may re-synchronize the display of the video content and the related additional content and correct for the difference in delivery times between the different types of contents.

As set forth above, in addition to merely displaying additional content, an additional content area (e.g., Iframe) may also receive user input from viewers. In some examples, this input may be provided back to a source of the video content (e.g., a video game) thereby allowing the viewers to actually influence and/or control features of the video content. For example, in some cases, a video player display may show video game content, and an additional content area may receive user input from a viewer that is not a player of the video game. This user input may be provided back to the video game, thereby allowing the non-player viewer to influence and/or control features of the video content. For example, through the additional content area, viewers may provide a variety of inputs, such as to add, remove and/or modify resources and player inventories in the game, to add, remove and/or modify appearances and functionalities of objects in the game, to raise or lower difficulty and skill levels, to modify rules, to add, remove, and/or modify tasks and story lines, to add and remove characters, to modify character appearance, ability, strength, health, and other characteristics, to add, remove, and/or modify obstructions to players, to add, remove, and/or modify locations, weather, seasons, geography, and many other inputs. In some examples, these inputs may be provided in a variety of ways, such as by voting in polls, purchasing or winning rights to provide the input, and through other means.

In some examples, an additional content area may allow viewers to provide user input that specifically relates to video content that is being shown in the video player at the time that the user input is received. As a specific example, an additional content area may allow a viewer to request that an obstruction (e.g., fence, ditch, minefield, etc) be placed adjacent to a location that is currently being shown in the video player display. For example, consider a scenario in which a viewer wishes to create an obstruction adjacent to first base, such as to obstruct and delay runners in the area of first base. In some examples, the viewer may provide user input to create such an obstruction while the video player display is showing an image of a runner at first base. One challenge related to providing such input back to the video game is that, due to the delay required to deliver video content to the viewer, the state of the video game may consistently be ahead of the video content that is currently being displayed to the viewer. For example, at the time that the video game receives the viewer's input to generate an obstruction at first base, the state of the video game may already have the same runner located at second base. Thus, if the additional content area were to provide the viewer's request to generate an obstruction back to the video game without any additional context, the obstruction might be generated at second base (e.g., where the runner currently is in the game state) as opposed to first base (e.g., where the runner was displayed at the time that the user input was received).

In some examples, in addition to merely providing user input from a viewer back to a video game, an additional content area may also provide related timing information in combination with the user input. For example, in some cases, an additional content area may provide, in combination with user input, an indication of the video content that is displayed by the video player at the time that the user input is received. In particular, in some examples, the additional content area may provide a timestamp assigned to a portion of video content (e.g., a video frame) that is displayed at the time that the user input is received. This additional timing information may allow the video game to process the user input in a manner that corresponds with the intent of the viewer that provided the input. For example, for the scenario described above, the video game may use the timing information (e.g., video frame timestamp), to determine that the user input is requesting that an obstruction be generated adjacent to first base (e.g., at the location associated with the prior game state indicated by the context information) as opposed to second base (e.g., the current game state location).

FIG. 1 is a diagram illustrating an example content delivery system that may be used in accordance with the present disclosure. As shown in FIG. 1, video content may be transmitted from a video content provider 130 to a video streaming service 120, which, in turn, may transmit the video content to viewer node 110. In particular, video content delivery service 122 may transmit the video content to the viewer node 110. In some examples, video may be transmitted from video content provider 130 to video streaming service 120 and, in turn, from video streaming service 120 to viewer node 110 over one or more communications networks, for example one or more local area networks (LAN's) and/or one or more wide area networks (WAN's), such as the Internet. Additionally, in some examples, video may be transmitted from video content provider 130 to video streaming service 120 and, in turn, from video streaming service 120 to viewer node 110 using streaming transmission techniques, in which portions of transmitted content may be received and played while subsequent portions of the transmitted content are being transmitted.

In some examples, the video content provided by video content provider 130 may include video of a live event, such as a video game, sporting event, news event, or other live event. In one specific example, video content provider 130 may be a video game player and may provide video captured from a video game. In some examples, the video content may be transmitted to viewer node 110 and played using live streaming techniques. For example, video of an event may be transmitted to viewer node 110 and played while the event is still occurring, albeit with some latency between the time that the video is captured by the provider 130 and the time that the video is eventually played at viewer node 110. In some examples, video content provider 130 may capture video using screen capture software, one or more cameras, and/or other video capture components.

The video content may be displayed at viewer node 110 via a user interface 111, such as a browser page. In particular, in some examples, the video content may be played by a video player, and the user interface 111A may include a video player display that displays the video content that is played. In particular, referring now to FIG. 2, an example user interface 111A is shown. User interface 111A includes a video player display 210, which may play video content transmitted from video streaming service 120. In some examples, to access user interface 111A, a viewer may log-in to a website for the video streaming service 120 and may then select a feed, channel, and/or page for a particular video content provider 130 that the user wishes to view. For example, in some cases, video streaming service 120 may receive several video content streams from several different video content providers. The video streaming service 120 may provide a listing or other indication of video content providers from whom video may be available, and the viewer may then select a feed, channel, and/or page for a desired video content provider 130.

As set forth above, in combination with the video content transmitted by the video streaming service 120, it may also be desirable to allow additional content to be displayed to viewers. In some examples, the additional content may include information about the video game or other video content that is being streamed. In some examples, the additional content may include information that is generated, updated and displayed live in real-time or near real-time, such as to reflect current game or other video content states. Also, in some examples, the additional content may be interactive content that allows the viewer to provide input, such as to vote and/or wager on features of the video game or other video content. For example, for a video game, the viewer may be permitted to influence various features of the video game, even though the viewer may not be an actual game player. In some examples, the additional content may include live statistics, such as player and/or team statistics (e.g., wins, losses, kills, points, rankings, etc.), inventory, location information, timing information, game object information, and other statistics. Furthermore, in some examples, the additional content may include information about a particular feed or channel on which the video content is transmitted. For example, the additional information may include live statistics or other information about viewers of a particular channel and/or subscribers to a particular player's video feed. In yet other examples, the additional content may include a secondary video game that may be played by viewers of the primary video game displayed in the video content. Many other types of additional content may be provided in combination with a video content stream. In some examples, by enhancing the interactive nature of content that is presented to the viewer, the additional content may improve the viewer's experience and potentially attract new and more devoted viewers.

Figure 2:
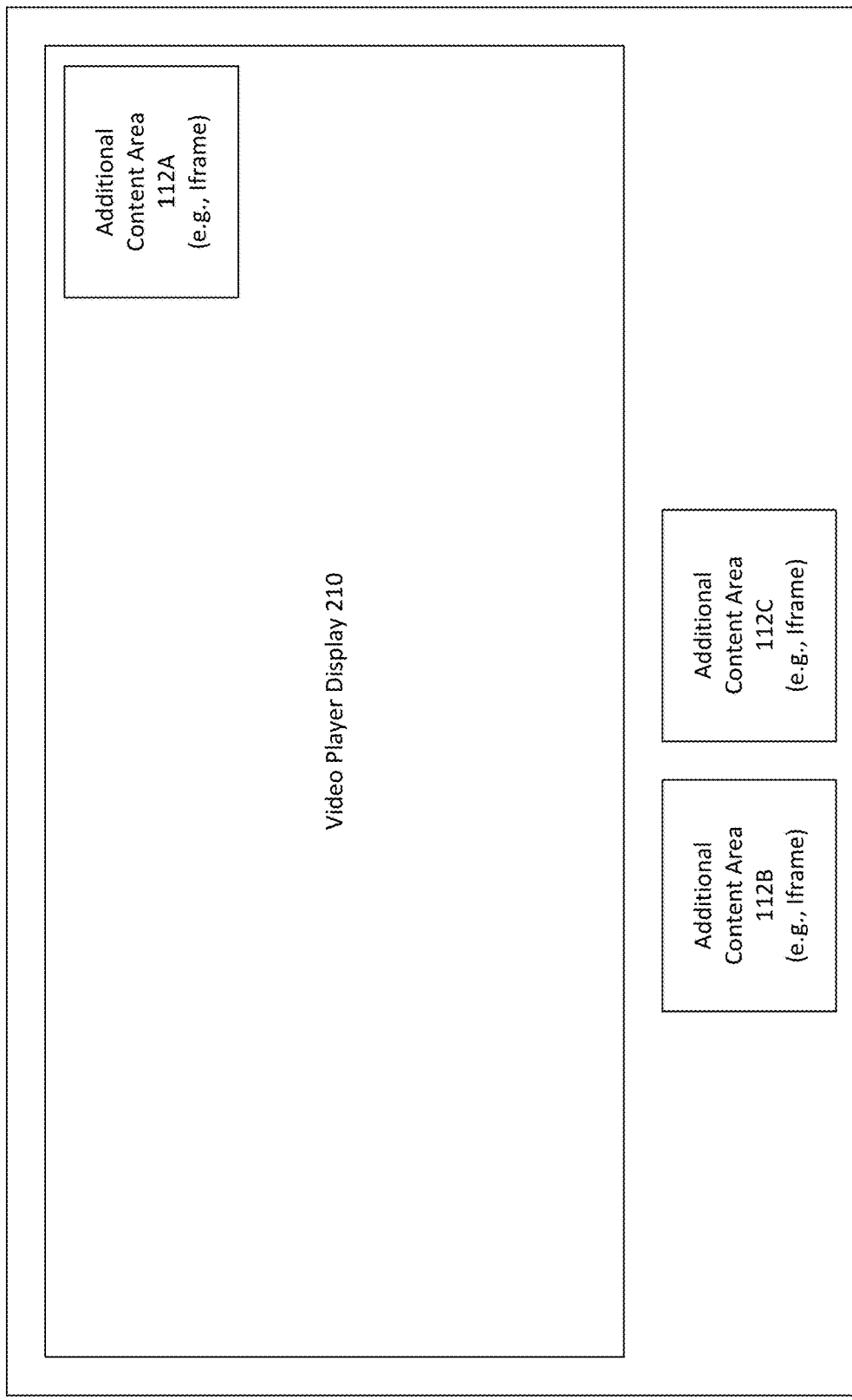
FIG. 2 is diagram illustrating an example user interface that may be used in accordance with the present disclosure.

Additional content may be displayed within a user interface 111 in at least one additional content area 112. In some examples, each additional content area 112 may be an inline frame (Iframe) that is embedded within the user interface 111. In the example of FIG. 2, user interface 111A includes three additional content areas 112A, 112B and 112C. In particular, additional content area 112A is a video player overlay area that overlays the video player display 210. By contrast, additional content areas 112B and 112C are external to the video player display 210. In some examples, video player overlay area 112A may overlay the entire area of the video player display 210 but may include certain portions that are transparent, such that only part of the video player display 210 is actually blocked by the video player overlay area 112A. It is noted that the quantities, locations, sizes, shapes and other features of the additional content areas 112A-C shown in FIG. 2 are merely intended as examples and that other additional content display areas with the same or different features may also be employed.

In some examples, the video streaming service 120 may provide a framework that allows additional content, such as described above, to be provided by third parties (e.g., parties other than the video streaming service or the video content provider). For example, referring back to FIG. 1, it is seen that additional content may be provided by an additional content developer 140, such as a third party developer external to video streaming service 120. Additionally, the video streaming service 120 may expose a developer interface 124, such as a web interface, which allows the additional content developer 140 to interact with the video streaming service 120. In some examples, the additional content developer 140 may use the developer interface 124 to register additional content with the video streaming service 120, for example by indicating various attributes of the additional content, such as a name, type (e.g., video player overlay, external to video player, etc.), a summary and/or description, author name, author email, support email, and/or other information.

In some examples, the video streaming service may allow testing of the additional content. In some examples, additional content may initially be tested locally, such as with the additional content assets (e.g., HTML, JavaScript, CSS, images, fonts, etc.) being served from a defined location (e.g., uniform resource identifier (URI)), thereby allowing rapid development iteration. When the developer 140 is satisfied with the locally-hosted test version, the additional content assets may be transitioned to a hosted testing phase, for example via developer interface 124. In the hosted testing phase, the additional content assets may be uploaded to video streaming service 120 as hosted additional content 123. In some examples, the assets may be uploaded, for example as a .ZIP file, via the developer interface 124. The hosted testing phase may allow the additional content developer 140 to ensure that the additional content works when served from the video streaming service 120. Some sanity checks may be performed on upload, such as making sure icons and screenshots are appropriately sized. In some examples, while in either the local test or the hosted test, additional content may be visible only to a developer-provided list of test accounts and/or a small subset of video streaming service staff. This may help to protect privacy and security of the assets being tested.

In some examples, once the hosted test is complete, the developer 140 may submit the additional content for review. For example, in some cases, the video streaming service 120 may review the additional content, such as to ensure that the additional content complies with various technical, content, security, quality, compatibility, social (e.g., violence, maturity, etc.), business, or other policies, and the like. In some examples, upon completion of the review, the developer 140 may be informed of a review state, such as that the additional content is either approved, rejected, or returned for specified revisions. In some examples, when additional content has been approved, the developer 140 may release the additional content, for example by selecting a release option using developer interface 124. In some examples, upon release of the additional content, it may be made available to video content providers 130, such as for embedding within their respective pages, channels or other content feeds. In some examples, developer interface 124 may allow additional content developers 140 to make certain additional content available to all video content providers 130 or only to specific video content providers 130. For example, in some cases, developer interface 124 may allow an additional content developer 140 to specify one or more video content providers 130 to whom additional content should (or should not) be made available.

As also shown in FIG. 1, video streaming service 120 may expose a video provider interface 125, such as a web interface, which allows video content providers 130 to interact with the video streaming service 120. In some examples, video provider interface 125 may allow video content provider 130 to browse available additional content, such as additional content that has been released by developers 140 (and/or specifically made available to the video content provider 130 by the additional content developer 140) as described above. In particular, video provider interface 125 may allow video content providers 130 to add and remove additional content from their respective pages/channels. In some examples, video content providers 130 may be able to add or remove additional content from their respective pages/channels at any time, without requiring the pages/channels to be refreshed by viewers in order for additional content to be added or removed from the pages/channels. In some examples, the additional content that is available to the video content provider may be filtered or otherwise organized according to various attributes, such as a particular game that the video content provider is playing, a particular game level, virtual location, and the like.

Figure 3:
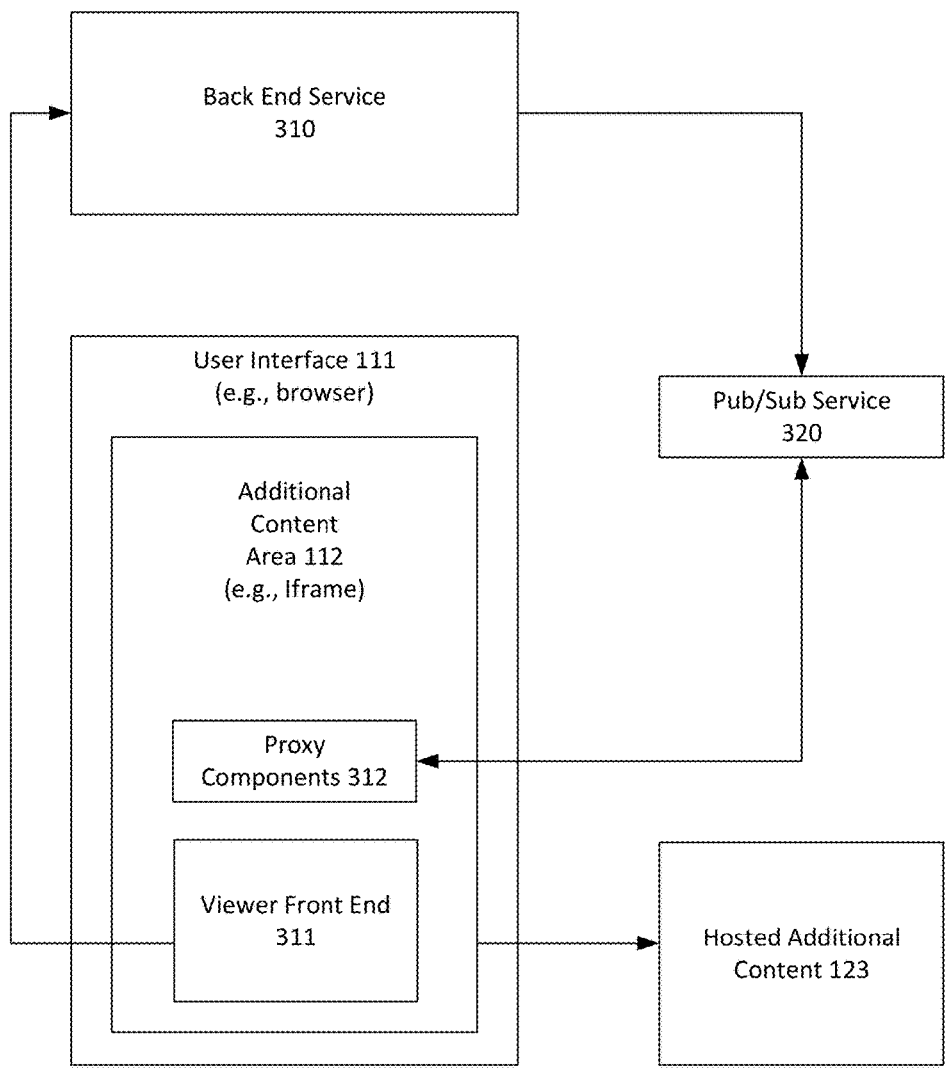
FIG. 3 is diagram illustrating an example execution architecture for additional content that may be used in accordance with the present disclosure.

Referring now to FIG. 3, an example execution architecture for additional content will now be described in detail. In particular, as shown in FIG. 3, the additional content area 112 may include a viewer front end 311, such as may be rendered in the additional content area 112 (e.g., Iframe) for the viewer's experience. In addition to viewer front end 311, the additional content may also include, or interact with, one or more video content provider front ends. For example, a configuration front end may be provided to allow the video content provider 130 to configure the additional content on the video content provider's channel/page. Additionally, a live front end may be provided to manage the video content provider's live experience. For example, the live front end may be rendered in an Iframe or other area within video provider interface 125, such as a live dashboard page for the video content provider 130. In some examples, the live front end may allow the video content provider 130 to perform privileged operations while live, such as creating a new poll or other interactive feature. In some examples, any or all of the front ends described above may include HTML, JavaScript and/or other rendered content.

As also shown in FIG. 3, the additional content area 112 may interact with an optional back end service 310 that may support execution of the additional content. In some examples, the back end service 310 may be developed, deployed, and maintained by the additional content developer 140. Back end service 310 may, for example, store data and/or state and communicate with the front ends. Some example techniques for communication between back end service 310 and the front ends and other components are described in detail below.

The additional content area 112 may also include proxy components 312, such as may provide methods for dealing with authentication, receiving notifications of stream properties, and listening to events. In some examples, the proxy components 312 may include one or more JavaScript files and may be created and hosted by the video streaming service 120. Also, in some examples, the video streaming service 120 may expose the proxy components 312 to the additional content developers 140 and instruct the additional content developers 140 to include/import the proxy components 312 within the additional content.

In some examples, proxy components 312 may provide callback functions that are invoked with context information about the channel being viewed (e.g., video resolution, latency to the video content provider, and channel identifier (ID)). Additionally, in some examples, proxy components 312 may provide an opaque ID that identifies a viewer without revealing the viewer's public viewer ID. For example, in some cases, each viewer associated with video streaming service 120 may have a public viewer ID that may be known or used by various parties, such as video streaming service 120, video content providers 130, and other viewers. Using the opaque ID, developers can determine a viewer's authenticated state. In some examples, opaque IDs may persist across multiple, and in some cases all, channels. Also, in some examples, opaque ID's may not change unless the viewer explicitly requests to rotate his or her identity. In some examples, developers may use back end service 310 to store per-viewer information, such as using opaque IDs as keys. In some examples, opaque ID's may be employed to help ensure that viewers do not perform inappropriate actions, such as voting twice in the same poll.

In some examples, opaque ID's may also be used to persist viewer-specific information. For example, in some cases, a viewer may play a video game that is rendered within an additional content area. The opaque ID's may be used to persist game state data for that viewer/player, such as player inventory etc., for example across sessions or different time periods or events. In one specific example, a viewer may play a video game within an additional content area, then stop playing, then re-start playing on a subsequent day, and the opaque ID may be used to load the appropriate player inventory for the viewer when he resumes play on the subsequent day.

In some examples, it may be desirable for additional content to be made aware of a viewer's public ID as opposed to merely the opaque ID. For example, in some cases, additional content display or otherwise use information based on viewers' public ID's. In these and other scenarios, additional content developers 140 may be permitted to allow the additional content to request the viewer's public ID. For example, an option may be provided in developer interface 124 for the developer 140 to cause the additional content to issue such a request to viewers.

In some examples, proxy component 312 may provide the additional content area 112 (e.g., Iframe) with an authentication token, such as a JavaScript Object Notation (JSON) Web Token (JWT). In some examples, the additional content area 112 may communicate with the back end service 310, such as to provide user input (e.g., voting in a poll, viewer game inputs, etc.) to the back end service 310. In some examples, to communicate with back end service 310, the additional content area may send a token, such as in a hypertext transfer protocol (HTTP) header, to the back end service 310. The token may be signed by the video streaming service 120, for example using a secret shared between the video streaming service 120 and the additional content developer 140. The back end service 310 may then use this secret to verify the incoming token and ensure that received messages are from a legitimate source. Also, the token itself may include reliable information about the role of the sender, such as whether the incoming message is from a viewer or a video content provider 130.

Figure 4:
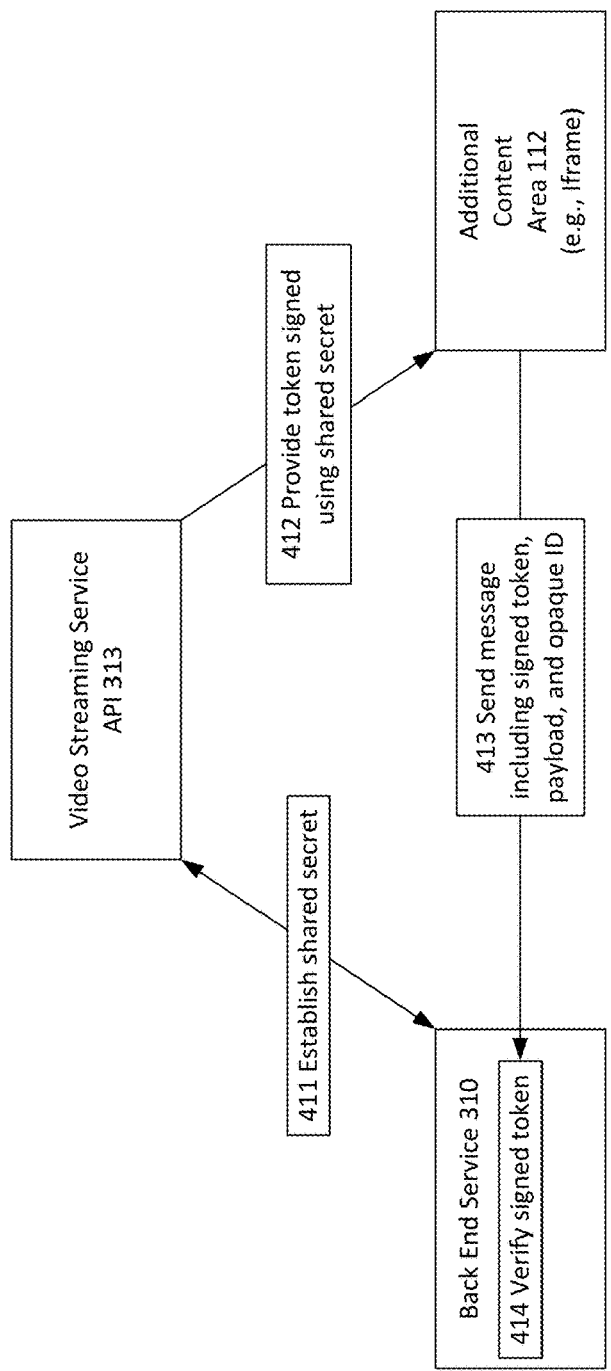
FIG. 4 is a diagram illustrating example communications from an additional content front end to back end that may be used in accordance with the present disclosure.

Referring now to FIG. 4, some example techniques for communicating from an additional content front end to back end will now be described in detail. In particular, as shown in FIG. 4, communications between the additional content front end and back end may be secured by establishing a shared secret between the video streaming service 120 and the additional content developer 140. For example, FIG. 4 shows, at action 411, that a shared secret is established between the back end service 310 and the video streaming service application programming interface (API) 313. In some examples, the shared secret may be managed via the developer interface 124. For example, in some cases, the additional content developer 140 may use the developer interface 124 to create new secrets, set active and/or expiration times for secrets, rotate among secrets, revoke secrets and perform other actions.

At action 412, the video streaming service API 313 provides a token (e.g., JWT) signed using the shared secret to the proxy components 312 in the additional content area (e.g., Iframe) 112. In some examples, the signed token may be requested by the proxy components 312 by calling the video streaming service API 313. At action 413, the viewer front end 311 of the additional content area 112 sends a message to the back end service 310. The message may include the signed token (e.g., in an HTTP or other header), the message payload, and, in some examples, the current opaque ID for the viewer as described above. It is noted that, for cases in which a viewer has accepted a request to share the viewer's public ID, the public ID may be included in the message (as opposed to the opaque ID). At action 414, the back end service 310 may verify the signed token and confirm that the message is from a legitimate source, for example using the shared secret established at action 411.

Figure 5:
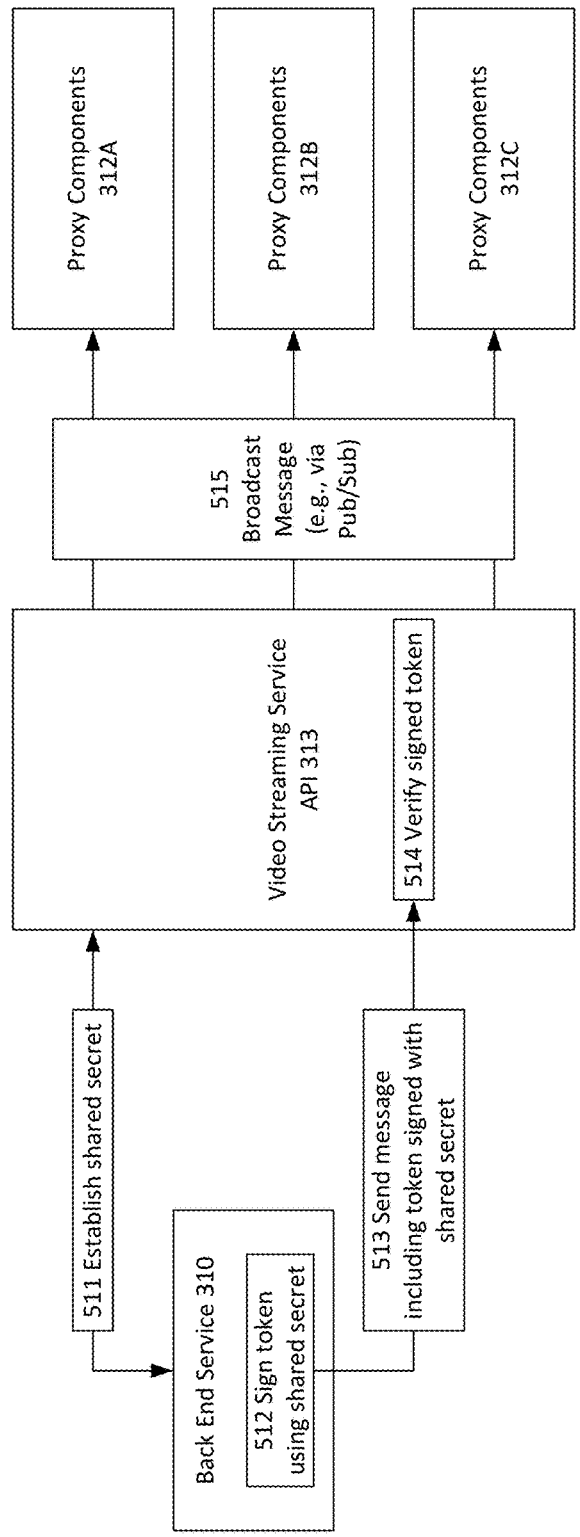
FIG. 5 is a diagram illustrating example communications from an additional content back end to front end that may be used in accordance with the present disclosure.

Thus, FIG. 4 depicts an example in which a signed token is used to send a message from the additional content front end to the back end. It is noted, however, that signed tokens may also be used to send messages from the additional content back end to the front end. For example, in some cases, the back end service 310 may broadcast additional content information to multiple viewers, such as polls, live game statistics and other game state information, for display within an additional content area 112. In particular, referring now to FIG. 5, some example techniques for communicating from an additional content back end to front end will now be described in detail. In particular, as shown in FIG. 5, at action 511, a shared secret is established between the back end service 310 and the video streaming service API 313. In some examples, the same shared secret may be used as was established at action 411 of FIG. 4. At action 512, the back end service 310 signs a token (e.g., JWT) using the established shared secret. At action 513, the back end service 310 sends a message, such as for broadcasting to multiple proxy components 312A-C being used by multiple different viewers, for example by issuing a call to video streaming service API 313. The back end service 310 may include the signed token in the message, such as in a message header. At action 514, the video streaming service API 313 uses the established shared secret to verify the signed token and confirm that the message is from a legitimate source. At action 515, the message may be broadcasted, for example via publication/subscription (pub/sub) service 320 of FIG. 3, to the multiple proxy components 312A-C. Pub/sub service 320 is a service that may allow parties, such as proxy components 312A-C to subscribe to various messages, such as messages that are sent/published by back send service 310. It is noted that, while FIG. 5 depicts an example in which a message is broadcast from back end service 310 to multiple different viewers, the back end service may also use the techniques described above to send targeted messages to specific individual viewers, such as inventory or other state information for a game being played by an individual viewer.

As set forth above, in some examples, certain types of user input may be provided by viewers, such as to control playing of the video content. For example, in some cases, certain keyboard keys, key combinations, and/or shortcuts may be input by users to provide various commands to the player, such as pause, un-pause, full screen, escape from full screen, mute, unmute, and others. When an area of additional content overlays a video player display, a viewer may provide input that causes focus to be assigned to the area of additional content. For example, a viewer may click on an area of additional content, such as to perform one or more actions (e.g., voting in a poll, etc.) within the area of additional content. One problem related to the display of additional content is that, when focus is provided to the additional content, user input that is intended for the player, such as the keyboard shortcuts described above, may not work. Thus, the techniques described herein may include various techniques for automatically returning focus back from an additional content area to a video player.

Figure 6A:
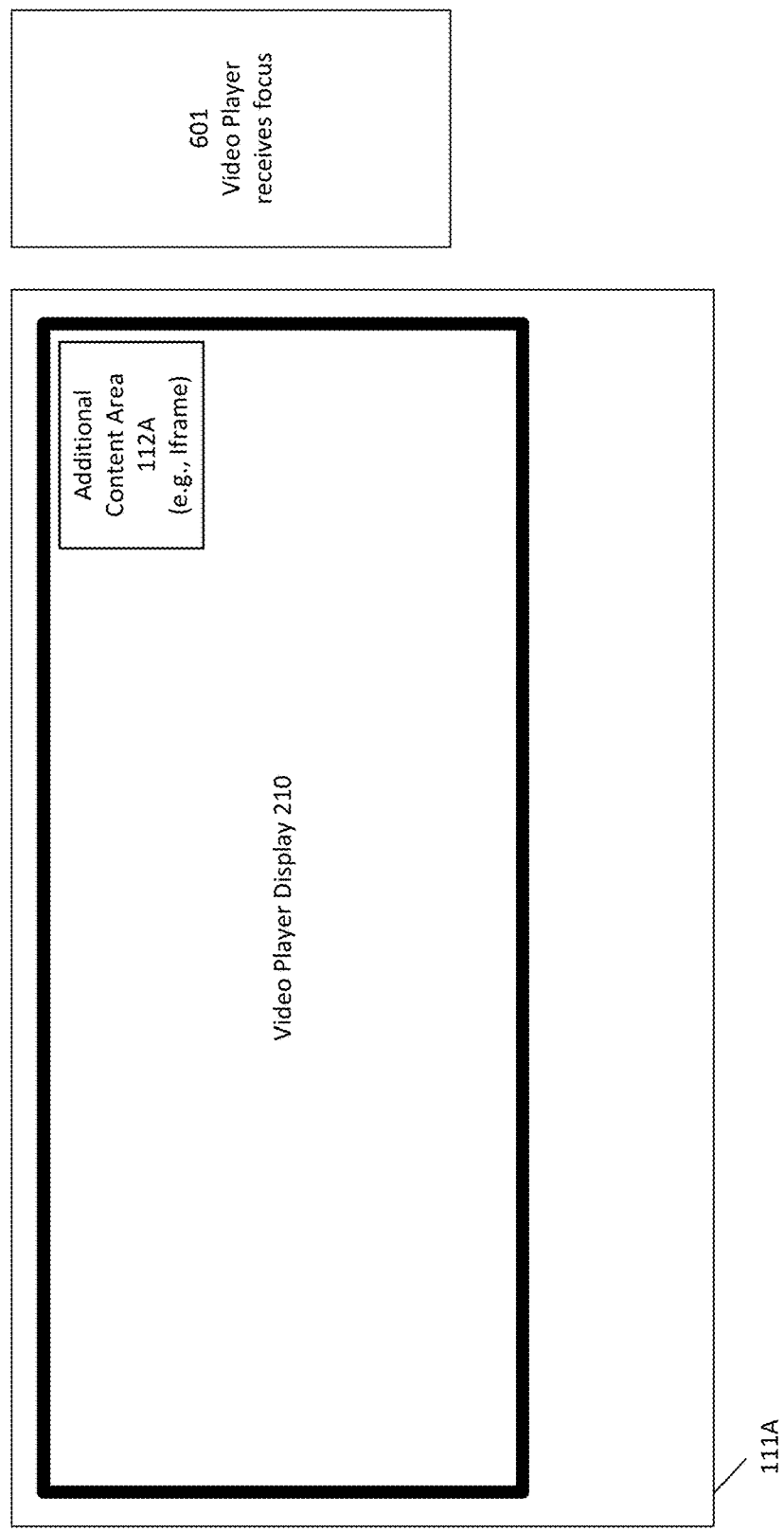
FIGS. 6A-6D are diagrams illustrating example controlling of focus that may be used in accordance with the present disclosure.

Some example techniques for controlling focus in relation to the video player display and additional content areas will now be described in detail with reference to FIGS. 6A-6D. In particular, as shown in FIG. 6A, user interface 111A may include a video player display 210 as well as an additional content area 112A (e.g., Iframe) that overlays the video player display 210. As indicated in comments 601, FIG. 6A shows that focus is currently being received by the video player display 210, as indicated by the thick bold outlining surrounding video player display 210 in FIG. 6A. The term focus, as used herein, refers to an indication of which entity (e.g., area, field, window, frame, etc.) of a set of entities is currently accepting, and/or assigned to accept, user input.

Figure 6B:
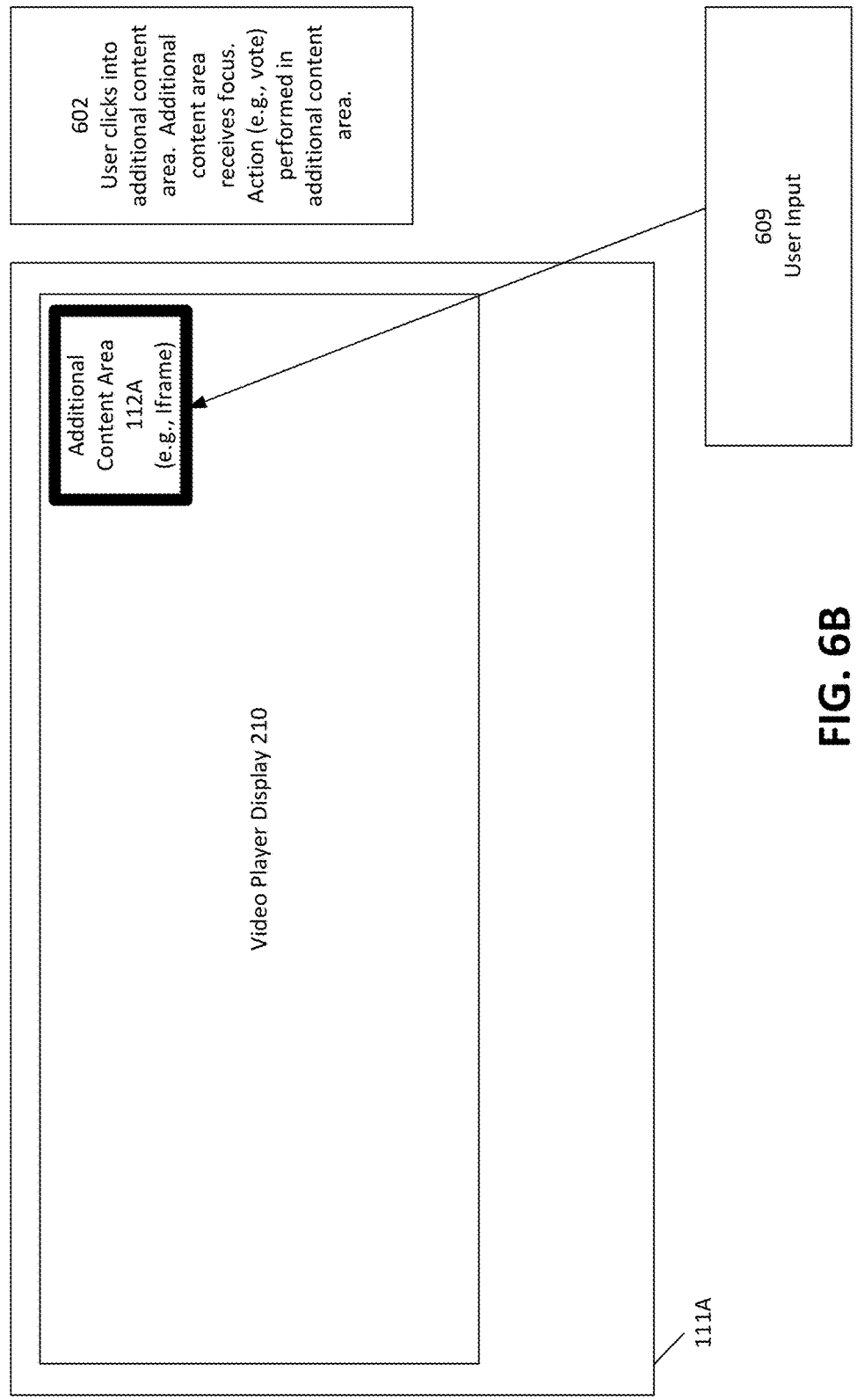

Referring now to FIG. 6B, as indicated by comments 602, it is seen that a user may provide user input 609 that causes focus to be re-assigned from the video player display 210 to the additional content area 112A. The user input 609 may include, for example, clicking or otherwise selecting a control or portion of the interface within additional content area 112A. The user may provide this input in order to perform an action within the additional content area 112A, such as voting in a poll provided by the additional content area 112A. The thick bold outlining surrounding additional content area 112A in FIG. 6B indicates that focus is temporarily re-assigned to additional content area 112A.

Figure 6C:
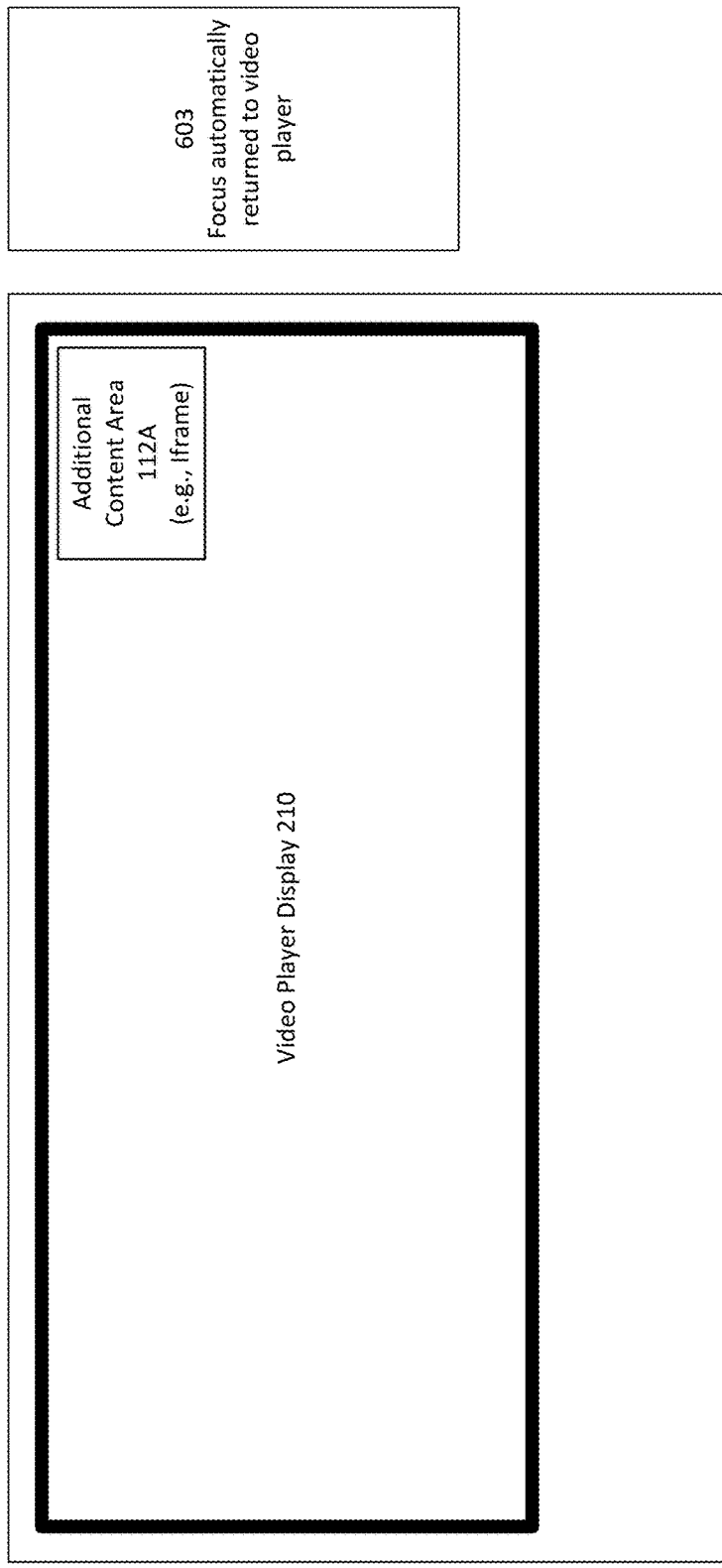

Referring now to FIG. 6C, as indicated by comments 603, it is seen that focus may be automatically returned to the video player display 210. In particular, in some examples, the focus may be automatically returned to the video player display 210, such as without requiring any additional user input subsequent to the user input that caused focus to be re-assigned to the additional content area 112A. The thick bold outlining surrounding video player display 210 in FIG. 6C indicates that focus has been automatically returned to the video player display 210. In some examples, focus may be automatically returned to the video player display 210 using one or more postMessages, which are known techniques for communicating between different entities (e.g., areas, fields, windows, frames, etc.) associated with a user interface. In particular, in some examples, upon receipt of the user input that causes the focus to be re-assigned to the additional content area 112A the additional content area 112A may generate a postMessage instructing the video player display 210 to claim focus. In some examples, this postMessage may be sent directly to the video player or may be sent to one or more intermediate components that may, in turn, generate other messages and/or postMessages to the video player. Upon receipt of a message and/or postMessage instructing the video player display 210 to claim focus, the video player display 210 may reclaim focus.

Figure 6D:
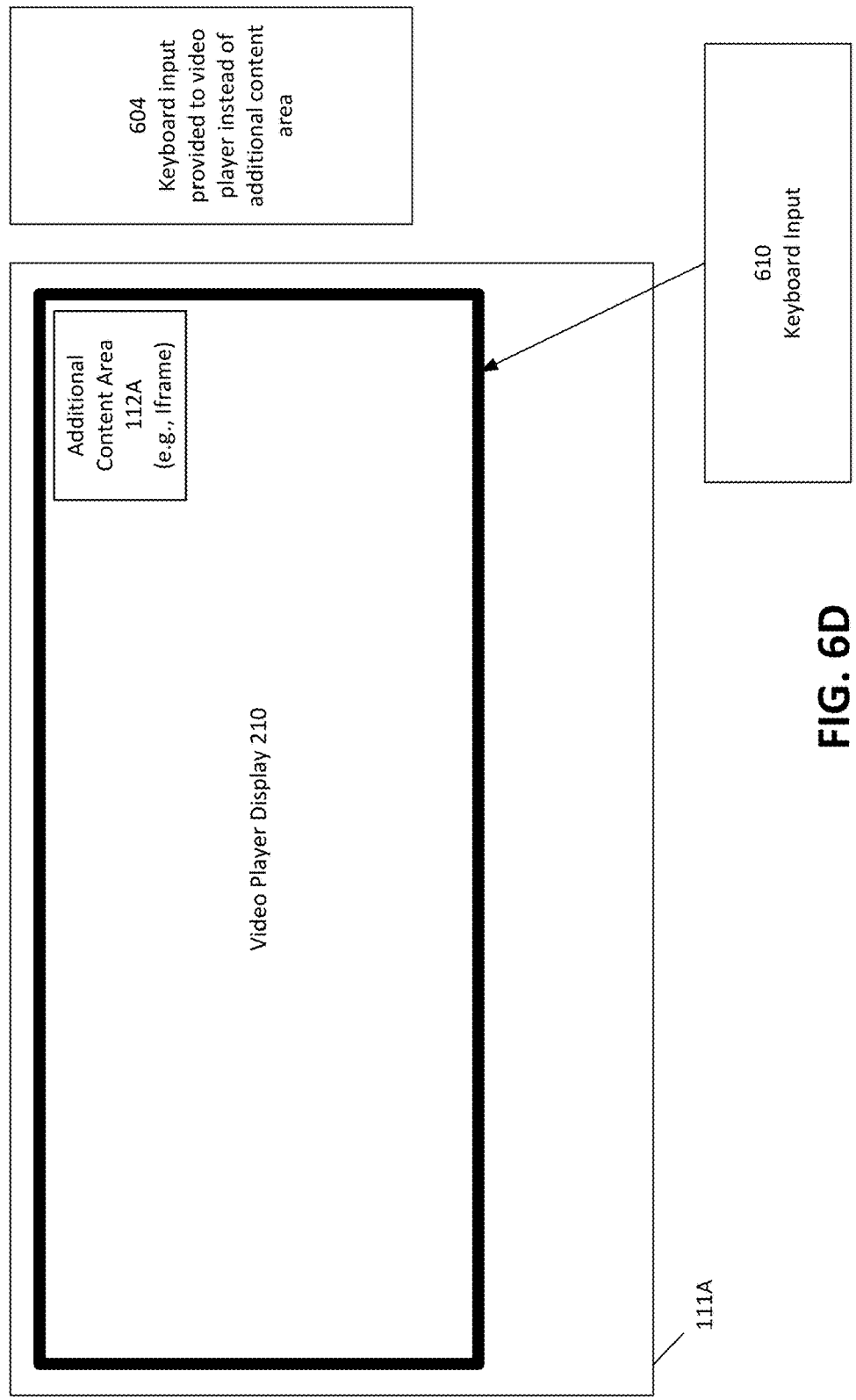

Referring now to FIG. 6D, it is seen that keyboard input 610 may be provided to the user interface 111A. In some examples, the keyboard input 610 may include one or more shortcut keys (or key combinations) for performing actions in the video player, such as pause, un-pause, full screen, escape from full screen, mute, unmute, and others. As indicated by comments 604, it is seen that keyboard input 610 is provided to the video player display 210 as opposed to the additional content area 112A. As should be appreciated, this is because focus was automatically returned to the video player display 210 (as shown in FIG. 6C) prior to receiving of the keyboard input 610. Thus, in some examples, automatically returning focus to the video player may increase the likelihood that user input is provided to the content for which the input is intended, thereby improving the user experience.

It is noted that FIGS. 6A-6D are merely intended to illustrate one example technique for controlling focus and that other additional or alternative techniques may also be employed. For example, in some cases, certain types of user input into an additional content area 112A may trigger an automatic return of focus back to the video player display 210, while other types of user input may not trigger such an automatic return of focus back to the video player display 210. For example, in some cases, input that does not trigger an automatic return of focus may include selection of a control that allows further input to be provided to the additional content area 112A. This type of input may include, for example, selection of a drop down menu, a text input field, and the like. For example, if a user selects a drop down menu within the additional content area 112A, it may be presumed that the user will still need to provide further input, such as to select a particular menu item within the selected drop down menu. Thus, it would impractical to return focus back to the video player display 210 until the user has provided this further input and selected the particular menu item within the drop down menu. Similarly, if a user selects a text input field within the additional content area 112A, it may be presumed that the user will still need to provide further input, such as typing text into the selected text input field. Thus, it would impractical to return focus back to the video player display 210 until the user has provided this further input and typed the text into the text input field.

Figure 7:
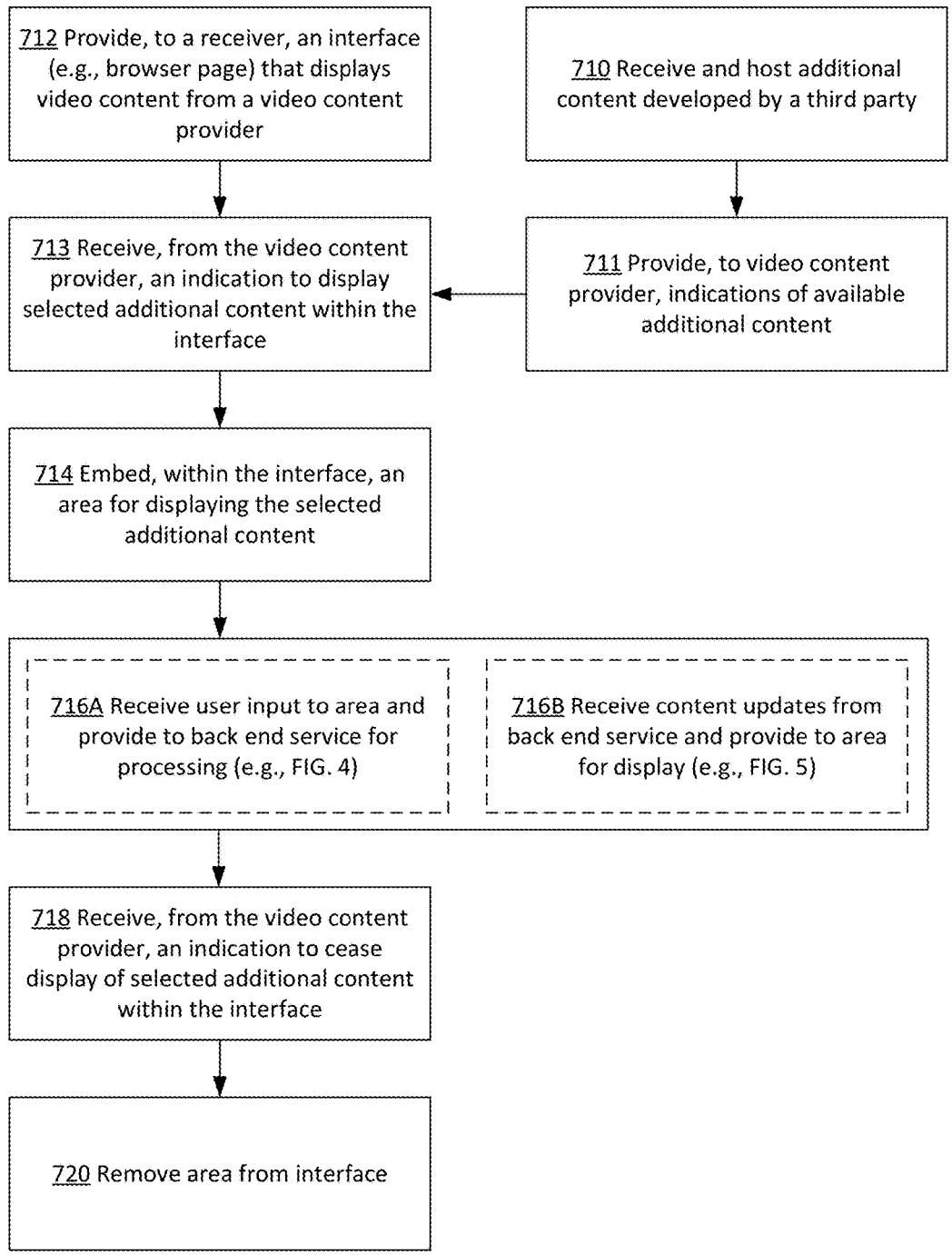
FIG. 7 is a flowchart illustrating an example process for providing video content and additional content that may be used in accordance with the present disclosure.

FIG. 7 is a flowchart illustrating an example process for providing video content and additional content that may be used in accordance with the present disclosure. In particular, at operation 710, the video streaming service may receive and host additional content developed by a third party (e.g., a party other than the video streaming service or a video content provider). As set forth above, in some examples, the additional content may be uploaded to the video streaming service by a third party developer, for example via a developer interface (e.g., developer interface 124 of FIG. 1) provided by the video streaming service. As also set forth above, in some examples, the additional content may be tested (e.g., in local, hosted, and/or other testing modes), reviewed (e.g., by the video streaming service), eventually approved by the video streaming service, and released by the developer for use. At operation 711, the video streaming service may provide, to a video content provider, indications of available additional content for selection by the video content provider. For example, in some cases, indications of additional content available to the video content provider may be provided via a video provider interface (e.g., video provider interface 125 of FIG. 1).

At operation 712, the video streaming service may provide, to a receiver (e.g., viewer node 110 of FIG. 1), an interface (e.g., a browser page) that displays video content from the video content provider. As set forth above, the video content may be transmitted from the video content provider to the video streaming service. The video streaming serving may then, in turn, transmit the video content to the receiver. As also set forth above, in some examples, the video content may include video of an event, such as a video game. Also, in some examples, the video content may be transmitted and played using live streaming techniques, for example in which portions of the video content are played while the event is still occurring. At operation 713, the video streaming service receives, from the video content provider, an indication to display, within the interface, selected additional content. For example, using video provider interface 125, the video content provider may browse available additional content (e.g., content indicated at operation 711) and select additional content for display within his or her page or other interface.

At operation 714, the video streaming service embeds, within the interface, an area (e.g., Iframe) that displays the selected additional content. As set forth above, in some examples, the area may be a video player overlay area (e.g., area 112A of FIG. 2), which overlays at least part of a video player display (e.g., video player display 210 of FIG. 2) that displays the video content. Also, in some examples, the area may be external to the video player display (e.g., areas 112B and 112C of FIG. 2). In some cases, the area may be embedded and displayed within the interface without requiring the receiver to refresh or update the interface.

At operation 716A, user input to the area may be received and may be provided to a back end service (e.g., back end service 310 of FIG. 3) for processing. In one specific example, the selected additional content may provide a poll, and the user input may include a vote or poll input. In another specific example, the video content may include a first video game that is played by the video content provider, and the selected additional content may include a second video game that is played by the receiver. In this example, the user input may include control input to the second video game. Some example techniques for sending communications from the area/front end to the back end service are described in detail above with respect to FIG. 4. In some examples, the video streaming service may assign, to the receiver, a first identifier that is made public (e.g., a public ID). Communications from the area to the party may be assigned a second identifier (e.g., an opaque ID) that identifies the receiver to the third party developer without exposing the first identifier to the third party developer.

At operation 716B, content updates from the back end service may be received and may be provided to the area for display. Such content updates may include, for example, updated game, state, and/or other updated content data. Some example techniques for sending communications from the back end service to the area/front end are described in detail above with respect to FIG. 5. In some examples, in operations 716A and/or 716B (or other cases), one or more communications between the third party developer and the area (e.g., Iframe) may be associated with a secret shared between the video streaming service and the third party developer. For example, in some cases, a token signed using the secret shared between the video streaming service and the third party developer may be included in one or more communications between the third party developer and the area. As described above, the association of the shared secret with these communications may provide security to the communications, such as by helping to ensure that they are sent from an authorized party.

At operation 718, the video streaming service receives, from the video content provider, an indication to cease display, within the interface, of the selected additional content. For example, using video provider interface 125, the video content provider may indicate that he or she wishes the selected additional content to be removed from his or her page or other interface. At operation 720, the video streaming service may remove the area from the interface. In some cases, the area may be removed from the interface without requiring the receiver to refresh or update the interface.

Figure 8:
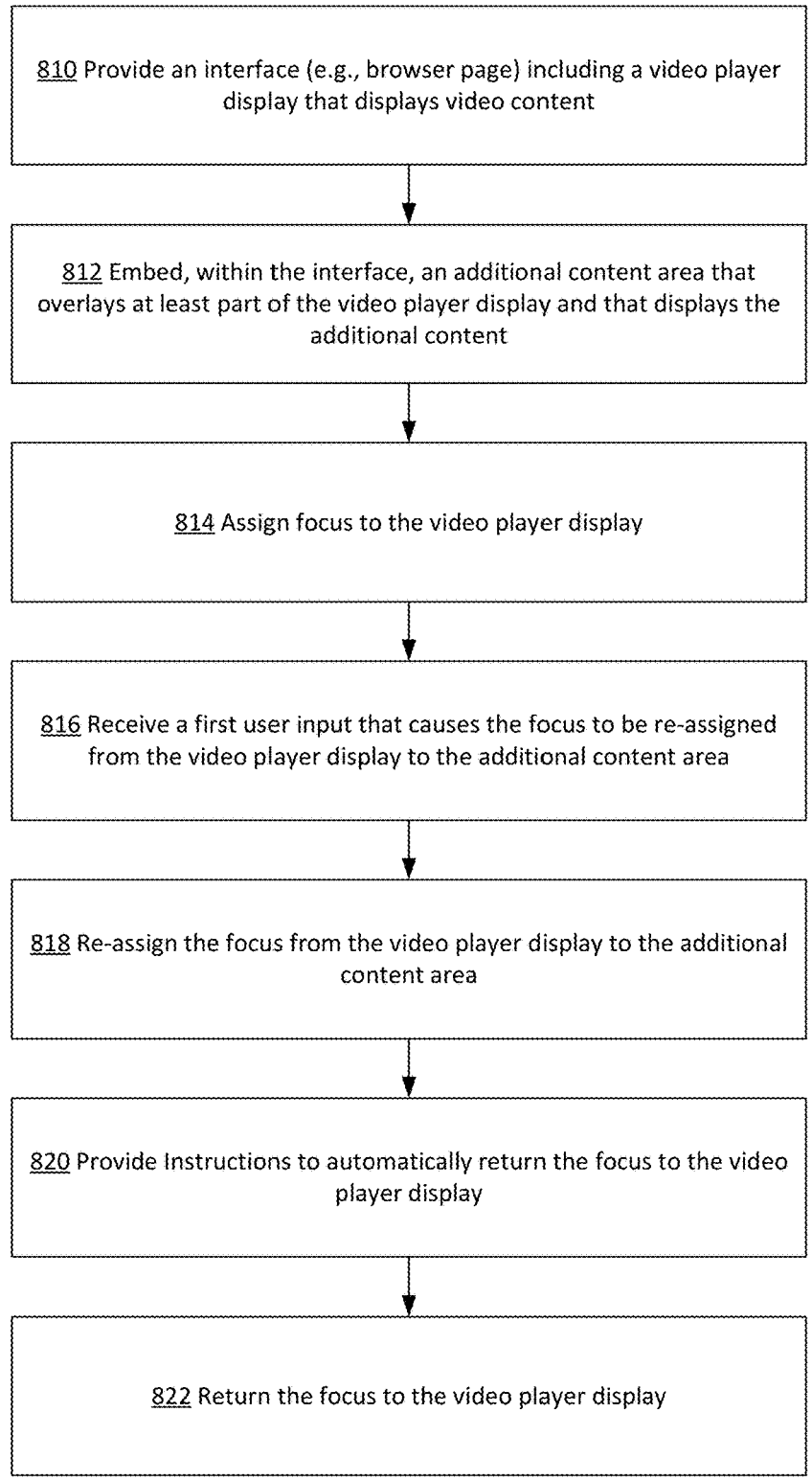
FIG. 8 is a flowchart illustrating an example process for controlling focus that may be used in accordance with the present disclosure.

FIG. 8 is a flowchart illustrating an example process for controlling focus that may be used in accordance with the present disclosure. In particular, at operation 810, the video streaming service may provide an interface (e.g., a browser page) including a video player display (e.g., video player display 210 of FIGS. 6A-6D) that displays video content. As set forth above, the video content may be transmitted from a video content provider to the video streaming service. The video streaming serving may then, in turn, transmit the video content to a receiver. As also set forth above, in some examples, the video content may include video of an event, such as a video game. Also, in some examples, the video content may be transmitted and played using live streaming techniques, for example in which portions of the video content are played while the event is still occurring.

At operation 812, the video streaming service embeds, within the interface, an additional content area (e.g., Iframe) that overlays at least part of the video player display and that displays the additional content. For example, as shown in FIGS. 6A-6D, additional content area 112A overlays at least part of a video player display 210. At operation 814, focus is assigned to the video player display. For example, as shown in FIG. 6A, focus may be assigned to the video player display 210 as indicated by the thick bold outline surrounding the video player display 210 in FIG. 6A. At operation 816, a first user input is received that causes the focus to be re-assigned from the video player display to the additional content area. For example, the first user input may include a user clicking (or otherwise selecting a control) within the area, for example to perform an action within the area (e.g., voting in a poll, etc.). At operation 818, focus is re-assigned from the video player display to the additional content area, such as in response to the first user input. For example, as shown in FIG. 6B, focus may be re-assigned to the additional content area 112A as indicated by the thick bold outline surrounding the additional content area 112A in FIG. 6B. In some examples, one or more components associated with the interface may be configured to perform any or all of operations 814, 816 and 818. For example, in some cases, if the interface is a web page, operations 814, 816, and 818 may be performed by one or more web browser components that display the web page.

At operation 820, instructions are provided to automatically return focus to the video player display. For example, subsequent to re-assignment of the focus from the video player display to the additional content area, the focus may be automatically returned to the video player display without receiving additional input subsequent to the first user input. In particular, in some examples, no additional user input may be received by the one or more components (e.g., web browser components) subsequent to the receiving of the first user input (e.g., at operation 816) and prior to the providing of the instruction to return focus to the video player display (e.g., at operation 820). At operation 822, focus may be returned to the video player display, for example based on the instruction provided at operation 820. For example, as shown in FIG. 6C, focus may be automatically returned to the video player display 210 as indicated by the thick bold outline surrounding the video player display 210 in FIG. 6C. In some examples, the providing of the instructions to return focus to the video player display may include sending one or more postMessages to the video player display. In particular, in some examples, upon receipt of the user input that causes the focus to be re-assigned to the additional content area, the additional content area may generate a postMessage instructing the video player display to claim focus. In some examples, this postMessage may be sent directly to the video player or may be sent to one or more intermediate components that may, in turn, generate other messages and/or postMessages to the video player. Upon receipt of a message and/or postMessage instructing the video player display to claim focus, the video player display may reclaim focus from the area. In some examples, such as shown in FIG. 6D, a key input command that controls behavior of the video player may be received subsequent to returning focus to the video player display. By virtue of the focus being returned to the video player, the key input command may be provided to the video player as intended by the user.

As set forth above, in some cases, focus may be automatically returned to the video player display for one or more first user input types and not automatically returned to the video player display for one or more second user input types. In some examples, the one or more second user input types may include selection of a control that allows further user input to be provided to the area, such as a drop down menu, a text input field, and the like.

Thus, as set forth above, a viewer interface may include both a video player display that displays video content and one or more additional content areas (e.g., Iframes) that display additional content. As also set forth above, in some examples, particular portions of the additional content displayed in an additional content area may be related to corresponding particular portions of the video content displayed by the video player. In a specific example, a video player display may display video content from a video game, while an additional content area may display state data (e.g., statistics, etc.) from the video game. In this example, a particular portion of the state data may sometimes relate to one or more corresponding video frames that were generated at, or around, the same time as the state data, such as a video frame that was rendered based on the state data. For example, an additional content area may display location coordinates for a particular character in the video game. In this scenario, a portion of the additional content that includes a particular set of location coordinates may be related to a corresponding frame in which the character is positioned at those same location coordinates. If the character is moved and its location changes in one or more subsequent frames, then those same location coordinates will no longer be accurate for describing the character's new location in the subsequent frames.

Figure 9A:
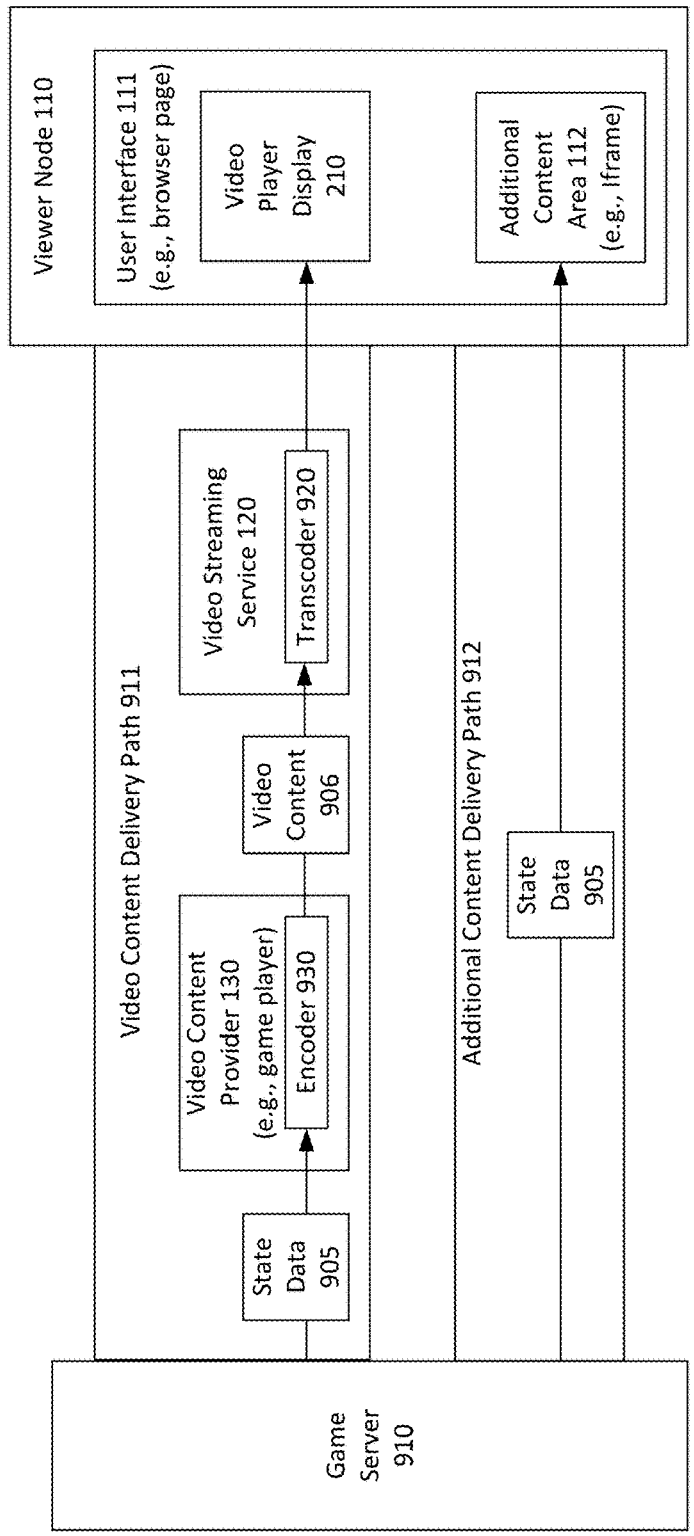
FIGS. 9A-9B are diagrams illustrating example content delivery paths that may be used in accordance with the present disclosure.

As described above, one challenge associated with the display of video content and related additional content is that, in some examples, the additional content may be delivered to the viewer more quickly than the video content. Referring now to FIG. 9A, some example paths for delivery of video content and additional content will now be described in detail. As shown in FIG. 9A, a game server 910 may manage execution of a video game. In the example of FIG. 9A, the user interface 111 at viewer node 110 includes a video player display 210 that displays video content 906 captured from the video game managed by game server 910. Additionally, user interface 111 includes an additional content area 112 that displays state data 905 from the video game managed by game server 910.

FIG. 9A illustrates an example video content delivery path 911 for delivering the video content 906 to the video player display 210. In particular, video content delivery path 911 includes a transmission of state data 905 from the game server 910 to the video content provider 130, which may be operated by a video game player, such as a player that controls one or more characters or other entities within the video game. The video content provider 130 may use the state data 905 to render the video content 906, which may be displayed to the game player at video content provider 130. Additionally, the video content provider 130 may capture the video content 906, such as using screen capture software or other video capture components, and may encode the video content 906, via encoder 930, for transmission to video streaming service 120. The video streaming service 120 may, in turn, transcode the video content 906 for re-transmission to viewer node 110, such as by decoding and re-encoding the video content 906, for example via transcoder 920.

FIG. 9A also shows an example additional content delivery path 912. In the example of FIG. 9A, additional content delivery path 912 includes a direct transmission of state data 905 from the game server to the additional content area 212 at the viewer node 110. It is noted that the delivery paths 911 and 912 shown in FIG. 9A are merely examples of paths that may be used to deliver video content and additional content and that other delivery paths with fewer, greater and/or different parties may also be employed. For example, in some cases, additional content delivery path 912 may include one or more intermediaries between the game server 910 and the viewer node 110, such as third party developer service or other services or parties.

As can be seen in FIG. 9A, video content delivery path 911 includes a number of different intermediaries (e.g., video content provider 130, video streaming service 120, etc.) and processes (e.g., rendering, encoding, transcoding, etc.) that may delay delivery of video content 906 to the viewer node 110, thereby causing the additional content (e.g., state data 905) to be delivered to the viewer more quickly than the video content 906. When the additional content is delivered to the viewer more quickly than the video content, a lack of synchronization between the additional content and the video content may result.

Figure 9B:
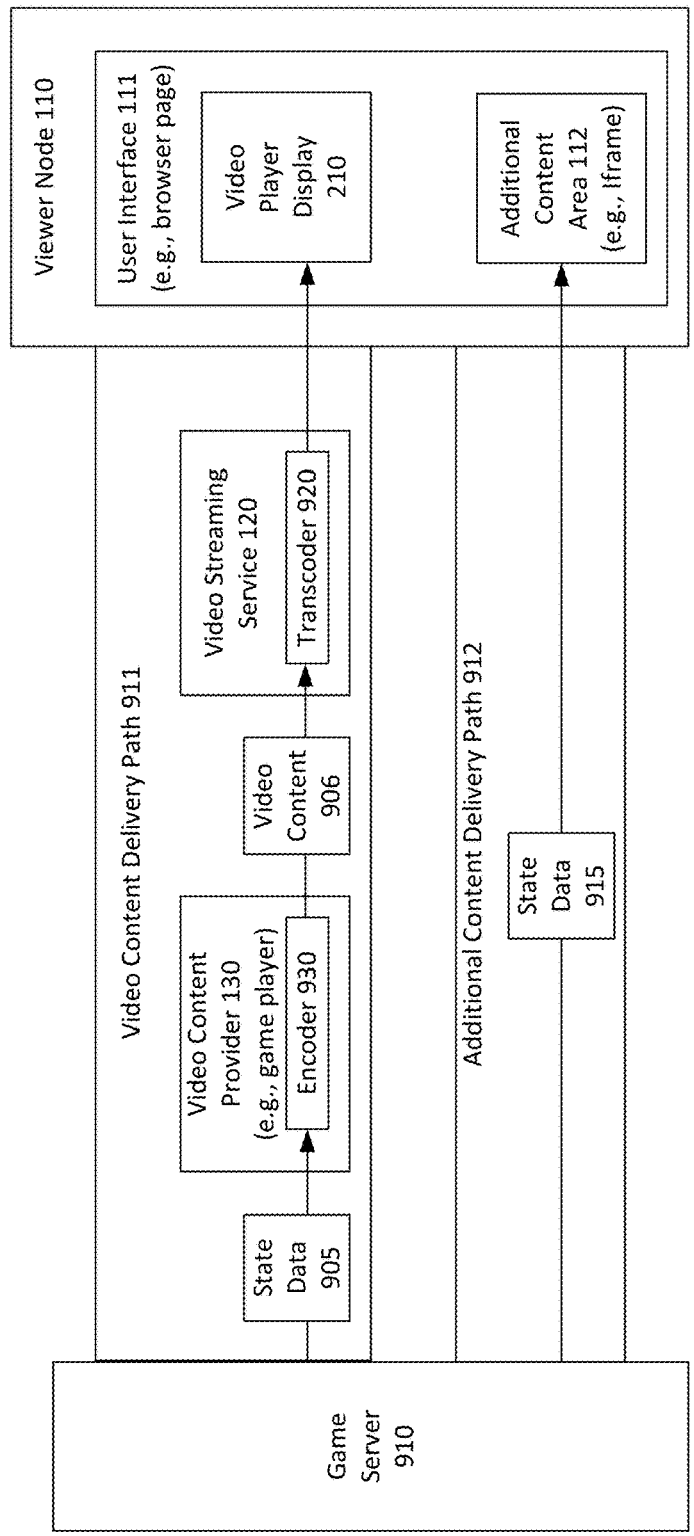

While FIG. 9A depicts an example in which the same state data 905 is sent to both the video content provider 130 and to the additional content area 112, it is noted that there is no requirement that the same state data 905 be sent to these components. In particular, FIG. 9B is identical to FIG. 9A, with the exception that, in FIG. 9B, different state data 915 is sent from the game server 910 to the additional content area 112. For example, in some cases, state data 905 that is sent to the video content provider 130 may include state data that is used by the video content provider 130 for rendering images, such as positions and other states of various characters, objects, and the like. By contrast, state data 915 that is sent to the additional content area 112 may include other information that may be of greater interest to viewers, such as player scores, inventories, health ratings, and the like. In other examples, state data 915 may include a portion and/or subset of state data 905 (or vice versa). In yet other examples, state data 915 may be generated, supplemented, reduced, or otherwise edited by one or more other parties, such as a third-party developer, the video streaming service 120, other game players, or any other parties.

While some of the above examples refer to user interface 111 as a web browser page, it is noted that the techniques described herein may be employed for providing video content and additional content in a variety of different interfaces and on a variety of different devices. For example, the techniques described herein may be employed to provide video content and additional content on desktop, laptop and other computers, monitors, phones, tablets, and other mobile devices, gaming consoles, televisions, set top boxes, and many other devices, such as via browsers, specialized and other applications, firmware, and any combination of these or other interfaces.

One example approach for correcting the lack of synchronization between additional content and video content involves the use of timestamps. In some examples, both portions (e.g., video frames) of the video content and portions of the additional content may be assigned timestamps. Additionally, in some examples, the timestamps may be synchronized such that a timestamp assigned to a particular portion of additional content may match a timestamp assigned to a corresponding related portion of video content. A diagram of an example synchronization technique that employs the use of timestamps is shown in FIG. 10. As shown, FIG. 10 includes a table 1010, which shows example times associated with delivery and display of various selected portions of video content and additional content. In particular, table 1010 includes a description column 1000, which describes the portion of video content and additional content that is shown in the corresponding row of table 1010. Specifically, table 1010 relates to an example of a baseball video game in which additional content includes state data that describes a location of a baseball player character within the game. The baseball player may run from home plate to first base and then subsequently run from first base to second base. As shown in column 1000, the top row of table 1010 relates to a portion of video content in which the runner is shown at home plate. The middle row of table 1010 relates to a subsequent portion of video content in which the runner has reached first base. The bottom row of table 1010 relates to another subsequent portion of video content in which the runner has reached second base.

As shown also shown in FIG. 10, table 1010 includes an additional content timestamp column 1001, which shows example additional content timestamps, and a video content timestamp column 1002, which shows example video content timestamps. In this particular example, because the additional content timestamps and the video content timestamps are synchronized, the timestamp values in columns 1001 and 1002 are identical for each row of table 1010.

Table 1010 further includes an additional content receipt time column 1003 and a video content receipt time column 1004. Additional content receipt time column 1003 indicates a time at which a corresponding portion of additional content is received by the viewer node, while video content receipt time column 1004 indicates a time at which a corresponding portion of video content is received by the viewer node. In the particular example of FIG. 10, it is assumed that the additional content delivery time, such as shown in path 912 of FIGS. 9A and 9B, is two seconds. This may represent the time required to deliver additional content, such as from a source (e.g., game server 910 of FIGS. 9A and 9B) to the viewer node. Additionally, it is assumed that the video content delivery time, such as shown in path 911 of FIGS. 9A and 9B, is ten seconds. This may represent the time required to create and deliver video content to the viewer node. Thus, it can be seen that, for each row in table 1010, the additional content receipt time shown in column 1003 is a value that is two seconds (e.g., the additional content delivery time) greater than the additional content timestamp shown in column 1001. Additionally, for each row in table 1010, the video content receipt time shown in column 1004 is a value that is ten seconds (e.g., the video content delivery time) greater than the video content timestamp shown in column 1002.

The receipt time values shown in columns 1003 and 1004, therefore, illustrate the lack of synchronization between receipt of additional content and video content. In particular, in the example of FIG. 10, when the viewer receives video content showing the player at home plate (e.g., at time 011), the viewer is simultaneously receiving state data indicating that the player is at first base (e.g., also at time 011). As another example, when the viewer subsequently receives video content showing the player at first base (e.g., at time 019), the viewer may be simultaneously receiving state data indicating that the player is at second base (e.g., also at time 019).

In some examples, such as in order to re-synchronize display of the additional content and the video content, the viewer node may, upon receipt of additional content, delay the display of the additional content. For example, in some cases, the viewer node may delay display of a portion of additional content until a corresponding related portion of video content, such as one or more related video frames, are received and displayed. For example, continuing with the baseball video game scenario described above, the viewer node may receive state data indicating that the baseball player is at first base at time 011. However, the viewer node may not immediately display this state data at time 011. Instead, the viewer node may delay display of this state data until it receives and displays the corresponding video content showing that the player is at first base (e.g., at time 019). Similarly, when the viewer node receives subsequent state data indicating that the baseball player is at second base (e.g., at time 017), the viewer node may again delay display of this state data until it receives and displays the corresponding video content showing that the player is at second base (e.g., at time 027).

In some examples, when the viewer node receives a particular portion of additional content, the viewer node may identify the timestamp assigned to that portion of the additional content (e.g., as shown in column 1003). The viewer node may then delay display of that portion of the additional content until it receives and displays a portion of video content that includes the same timestamp as was assigned to the portion of the additional content (e.g., as shown in column 1004). In this manner, the viewer node may re-synchronize the display of the video content and the related additional content and correct for the difference in delivery times between the different types of contents. As shown in FIG. 10, table 1010 further includes a combined content display time column 1005, which indicates example times at which related portions of additional content and video content may be displayed, such as simultaneously or partially simultaneously with one another. In one example, at the time indicated in each row of column 1005, a portion of video content may be displayed in a video player display, while a related portion additional content may be simultaneously displayed in an additional content area, such as an Iframe. It is noted that the example display times in column 1005 assume that there is no delay (or an insubstantial delay) between the time that a portion of video content is received and the time that the time that the portion of video content and its related portion of additional content are displayed. It is noted, however, that there may sometimes be a non-insubstantial delay between the time that video content is received and displayed, and the display of the related additional content may also be further delayed so that it may be displayed together with the video content.

As described above, the times depicted in FIG. 10 relate to an example in which there is a constant two second delivery time for the additional content and a constant ten second delivery time for the video content. In many cases, however, the respective delivery times for the additional content and the video content may vary throughout the course of transmission. For example, in some cases, the delivery time for the video content could temporarily increase to twelve seconds, while the delivery time for the additional content could remain unchanged at two seconds. In another example, the delivery time for the video content could temporarily decrease to eight seconds, while the delivery time for the additional content could also temporarily decrease to one second. In some examples, these changes may be due to various factors, such as changing bandwidths and other network conditions. Another advantageous feature of the timestamp-based synchronization techniques described above is that they may, in some examples, allow video content and related additional content to remain synchronized even in cases when the video content delivery times and/or additional content delivery times change during transmission.

Moreover, the additional content delivery time and/or video content delivery times may also vary simultaneously between different viewers. For example, at any given instance, the video content delivery time to a first viewer could be ten seconds, while the video content delivery time to a second viewer could be thirteen seconds. This may occur for example, when the first viewer has a shorter and/or faster delivery path than the second viewer to the video streaming service 120. As another example, at any given instance, the additional content delivery time to a first viewer could be two seconds, while the additional content delivery time to a second viewer could be three seconds. Yet another advantageous feature of the timestamp-based synchronization techniques described above is that they may, in some examples, allow video content and related additional content to remain synchronized for each of multiple different viewers even in cases when the video content delivery times and/or additional content delivery times vary simultaneously between those different viewers.

It is further noted that, while the example of FIG. 10 relates to the use of timestamps to synchronize additional content and video content, there is no requirement that timestamps must be used and other techniques may also be employed. For example, in some cases, an expected difference between the additional content delivery time and the video content delivery time may be predicted or estimated, such as based on observed and/or historical data delivery time data and other factors. Upon being received by the viewer node, the additional content may then have its display delayed based on this predicted or estimated difference, such as by delaying the display of the additional content by the amount of the predicted or estimated difference.

While some of the above described examples relate to scenarios in which a viewer receives portions of additional content prior to respective related portions of video content, the above described techniques may also be employed in scenarios in which portions of video content are received prior to respective related portions of additional content. For example, in these cases, display of a received portion of video content may be delayed until a related portion of additional content is received, such as a portion of additional content with a timestamp that matches the timestamp of the received portion of video content.

Figure 11:
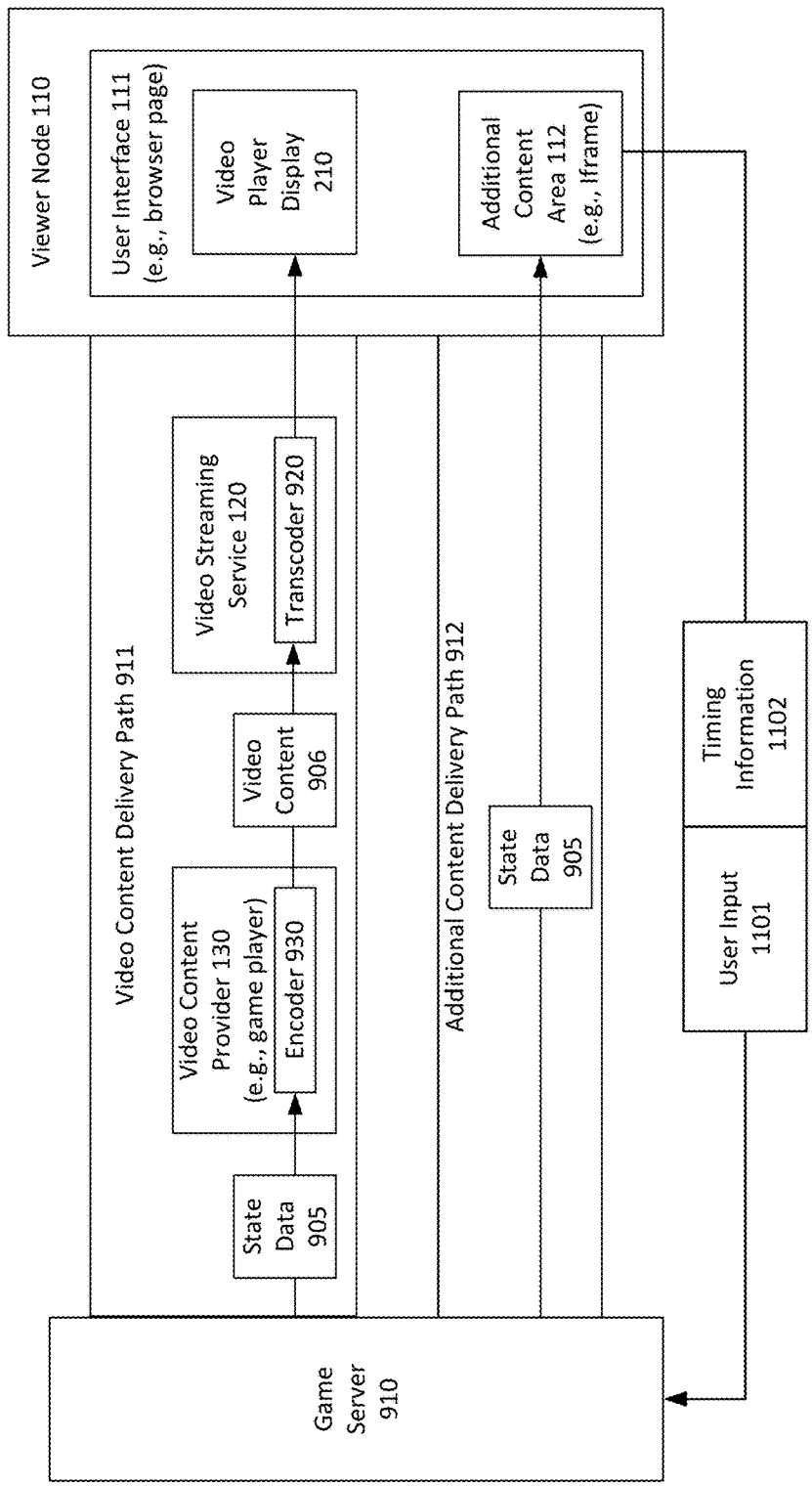
FIG. 11 is a diagram illustrating example content delivery paths and user input paths that may be used in accordance with the present disclosure.

As described above, in addition to merely displaying additional content, an additional content area (e.g., Iframe) may also receive user input from viewers. In some examples, this input may be provided back to a source of the video content (e.g., a video game) thereby allowing the viewers to actually influence and/or control features of the video content. For example, in some cases, a video player display may show video game content, and an additional content area may receive user input from a viewer that is not a player of the video game. This user input may be provided back to the video game, thereby allowing the non-player viewer to influence and/or control features of the video content. Referring now to FIG. 11, it is seen that user input 1101 may be received by the additional content area 112 and provided from the additional content area 112 back to game server 910. User input 1101 may be provided by a viewer that operates viewer node 110. The viewer that provides the user input 1101 may not be a player of the video game from which video content 906 is captured and displayed in video player display 210. It is noted that, although FIG. 11 depicts a direct path from additional content area 112 to game server 910, the user input may be delivered from additional content area 112 to game server 910 through one or more intermediaries, such as a third part developer service, etc. It is further noted that, in FIG. 11 and in other examples in which user input 1101 is provided to a recipient, wholly or partially different state data (e.g., state data 915 of FIG. 9B) and/or other information may sometimes be provided to additional content area 112, for example as an alternative or in addition to state data 905.

In some examples, the user input 1101 provided through the additional content area 112 may include a variety of inputs, such as to add, remove and/or modify resources and player inventories in the game, to add, remove and/or modify appearances and functionalities of objects in the game, to raise or lower difficulty and skill levels, to modify rules, to add, remove, and/or modify tasks and story lines, to add and remove characters, to modify character appearance, ability, strength, health, and other characteristics, to add, remove, and/or modify obstructions to players, to add, remove, and/or modify locations, weather, seasons, geography, and many other inputs. In some examples, these inputs may be provided in a variety of ways, such as by voting in polls, purchasing or winning rights to provide the input, and through other means.

In some examples, an additional content area may allow viewers to provide user input that specifically relates to video content that is being shown in the video player at the time that the user input is received. Some examples for effective management of this user input will now be described with reference to FIG. 12. As shown, FIG. 12 depicts a table 1210 including columns 1000-1005 with identical values as shown in table 1010 of FIG. 10. Table 1210 also includes an additional user input timing information column 1200, which will be described in detail below. As a specific example to illustrate the use of FIG. 12, an additional content area may allow a viewer to request that an obstruction (e.g., fence, ditch, minefield, etc) be placed adjacent to a location that is currently being shown in the video player display. For example, consider a scenario in which a viewer wishes to create an obstruction adjacent to first base, such as to obstruct and delay runners in the area of first base. In some examples, the viewer may provide user input to create such an obstruction while the video player display is showing an image of a runner at first base (e.g., at time 019 as indicated in the middle row of combined content display time column 1005). One challenge related to providing such input back to the video game is that, due to the delay required to deliver video content to the viewer, the state of the video game may consistently be ahead of the video content that is currently being displayed to the viewer. For example, at the time that the video game receives the viewer's input to generate an obstruction at first base (e.g., time 019), the state of the video game may already have the same runner located at second base. For example, in the game state, the player reaches second base at time 017 as indicated in the bottom row of timestamp columns 1001 and 1002. Thus, if the additional content area were to provide the viewer's request to generate an obstruction back to the video game without any additional context, the obstruction might be generated at second base (e.g., where the runner currently is in the game state) as opposed to first base (e.g., where the runner was displayed at the time that the user input was received).

In some examples, in addition to merely providing user input from a viewer back to a video game, an additional content area may also provide related timing information in combination with the user input. Referring back to FIG. 11, it is seen that, timing information 1102 may be provided along with user input 1101 from additional content area 112 to game server 910. For example, in some cases, the timing information 1102 may include an indication of the video content that is displayed by the video player at the time that the user input is received. In particular, in some examples, the timing information 1102 may include a timestamp assigned to a portion of video content (e.g., a video frame) that is displayed at the time that the user input is received.

In particular, referring back to FIG. 12, column 1200 shows example timing information 1102. As shown, the values indicated in column 1200 are identical to the timestamp values shown in columns 1001 and 1002 for each row of table 1210. For example, an image of a runner at first base may be displayed in the video player display 210 at time 019 as indicated by the middle row of combined content display time column 1005. As described in the example above, a viewer may provide input at time 019 through the additional content area 112 to request that an obstruction be generated adjacent to the location currently being displayed in the video player display, which is first base. In this example, the timing information 1102 provided back to the game server 910 may include the timestamp value 009, which is the timestamp of the portion of video content that is displayed at time 019. This timing information (e.g., timestamp 009) may then be used by the game server 910 to determine that the requested obstruction should be generated adjacent to first base (e.g., at the location associated with the timestamp 009) as opposed to second base (e.g., the current game state location).

It is noted that, while the example of FIG. 12 relates to the use of timestamps, there is no requirement that timestamps must be used and other techniques may also be employed. For example, in some cases, an expected video content delivery time may be predicted or estimated, such as based on observed and/or historical data delivery time data and other factors. In some cases, a time at which video content is generated could be estimated by subtracting the expected video content delivery time from the time at which the video content is received by the viewer. Thus, an estimated video content generation time could be calculated for a portion of video content that is displayed in the video player when the user input 1101 is received. This estimated video content generation time may then be included along with the user input 1101 in timing information 1102.

Figure 13:
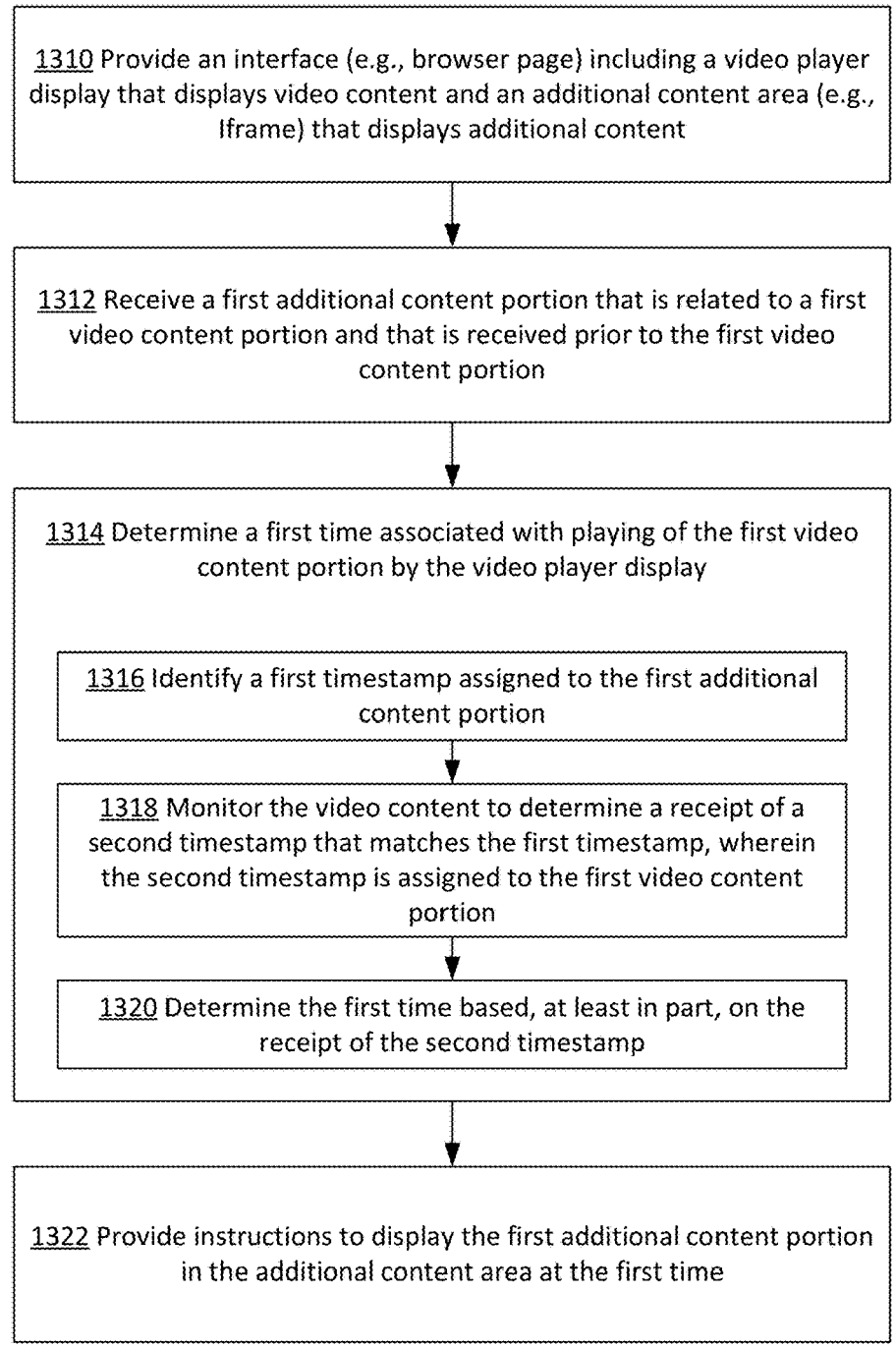
FIG. 13 is a flowchart illustrating an example process for associating video content and additional content that may be used in accordance with the present disclosure.

FIG. 13 is a flowchart illustrating an example process for providing video content and additional content that may be used in accordance with the present disclosure. The process of FIG. 13 is initiated at operation 1310, at which an interface (e.g., browser page) is provided including a video player display that displays video content and an additional content area (e.g., Iframe) that displays additional content. The interface may be provided by, for example, transmitting or otherwise providing data used to render and/or display the interface at the first compute node. The interface may be displayed at a first compute node, such as viewer node 110 of FIG. 10. The video content displayed in the video player display may include a plurality of video content portions (e.g., video frames) that are displayed at different times with respect to one another. In some examples, the video content, including each portion of the video content, may be transmitted to the first compute node by the video streaming service. The additional content displayed in the additional content area may include a plurality of additional content portions that are displayed at different times with respect to one another. In some examples, the video content may include video captured from a video game, and the additional content may include state data (e.g., statistics) from the video game. Additionally, in some examples, the additional content may include commentary that describes the video content. In some examples, each of the plurality of additional portions may be related to one or more respective video content portions. For example, an additional content portion that includes a portion of state data from a video game may be related to a video content portion that includes video generated by the video game based on that portion of state data. Furthermore, in some examples, timestamps may be assigned to the plurality of video content portions and to the plurality of additional content portions. In some examples, the timestamps may be synchronized such that a timestamp assigned to a particular portion of additional content may match a timestamp assigned to a corresponding related portion of video content.

At operation 1312, a first additional content portion is received by the first compute node (e.g., viewer node). The first additional content portion may be related to a first video portion. The first compute node may receive the first additional content portion prior to receiving the first video content portion. As a specific example, referring back to FIG. 10, the first additional content portion may include state data that indicates that a character in a baseball video game is at home plate. In the example of FIG. 10, the additional content portion indicating that the character is at home plate may be received at time 003, as indicated by the top row of column 1003. By contrast, the related video content portion showing the character at home plate may not be received until time 011, as indicated by the top row of column 1004.

At operation 1314, a first time is determined associated with playing of the first video portion by the video player display. In some examples, the first time may be determined by performing operations 1316, 1318 and 1320. In particular, at operation 1316, a first timestamp assigned to the first additional content portion is identified. For example, as shown in FIG. 10, the additional content portion indicating that the character is at home plate may be assigned timestamp 001, as indicated by the top row of column 1001. At operation 1318, the video content may be monitored to determine a receipt of a second timestamp that matches the first timestamp, wherein the second timestamp is assigned to the first video portion. For example, in some cases, the video player included in the interface may monitor incoming video content portions (e.g., video frames) received from the video streaming service to determine the timestamps assigned to the incoming video content portions. In some examples, the video player may continually notify the additional content area of timestamps assigned to the incoming video content portions (e.g., video frames) that are received by the video player. The additional content area may, in turn, monitor these timestamp notifications from the video player to determine when the video player has received a second timestamp that matches the first timestamp. For example, as shown in FIG. 10, the video player may receive a video content portion having timestamp 001 at time 011, as indicated by the top row of column 1004. Accordingly, in some examples, at time 011, the video player may notify the additional content area that a video content portion having timestamp 001 has been received by the video player. At operation 1320, the first time is determined based, at least in part, on the receipt of the second timestamp. In some examples (e.g., as in FIG. 10), it may be assumed that the first video content portion is displayed instantaneously (or nearly instantaneously) upon its receipt by the viewer node. In these examples, the first time may be determined to be equivalent to the time that the first video content portion is received by the viewer node. In other examples, it may be assumed that there will be a delay between receipt of the first video content portion and its display. In these examples, the first time may be calculated by adding this expected delay time to the receipt time of the first video content portion.

At operation 1322, instructions are provided to display the first additional content portion in the additional content area at the first time. For example, the additional content area may have associated code or other instructions that instruct the additional content area to display the first additional content portion at the first time, and the additional content area may then display the first additional content portion at the first time. In this manner, the display of the first additional content portion in the additional content area may be delayed until display of the first video content portion in the video player display. This may allow the first additional content portion and the first video content portion to be displayed simultaneously or partially simultaneously with one another.

Figure 14:
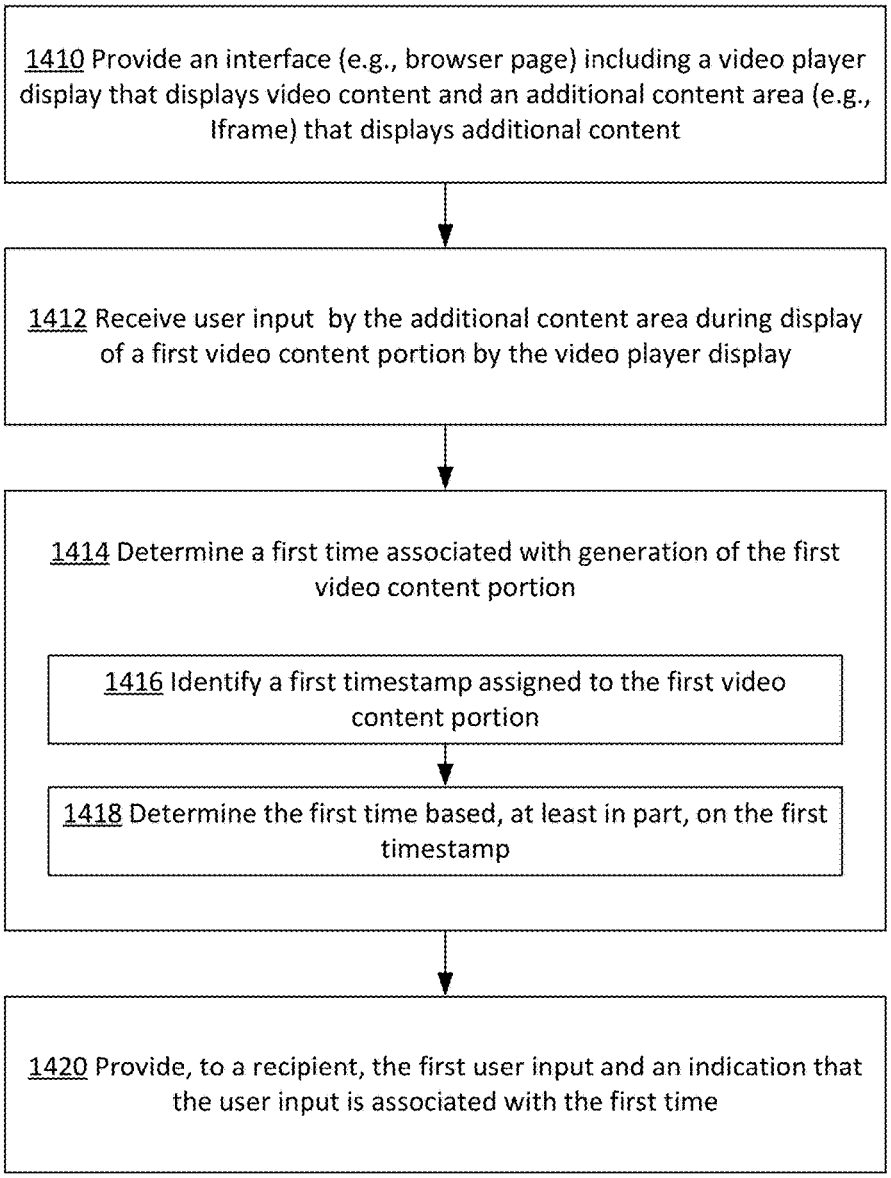
FIG. 14 is a flowchart illustrating an example process for associating video content and user input that may be used in accordance with the present disclosure.

FIG. 14 is a flowchart illustrating an example process for associating video content and user input that may be used in accordance with the present disclosure. The process of FIG. 14 is initiated at operation 1410, at which an interface (e.g., browser page) is provided including a video player display that displays video content and an additional content area (e.g., Iframe) that displays additional content. The interface may be provided by, for example, transmitting or otherwise providing data used to render and/or display the interface at the first compute node. The interface may be displayed at a first compute node, such as viewer node 110 of FIG. 10. The video content displayed in the video player display may include a plurality of video content portions (e.g., video frames) that are displayed at different times with respect to one another. In some examples, the video content, including each portion of the video content, may be transmitted to the first compute node by the video streaming service. The additional content displayed in the additional content area may include a plurality of additional content portions that are displayed at different times with respect to one another. In some examples, the video content may include video generated by a video game, displayed on a second compute node operated by a video game player, captured from the second compute node, and transmitted to the first compute node (e.g., via a video streaming service). Furthermore, in some examples, timestamps may be assigned to the plurality of video content portions and to the plurality of additional content portions. In some examples, the timestamps may be synchronized such that a timestamp assigned to a particular portion of additional content may match a timestamp assigned to a corresponding related portion of video content.

At operation 1412, the first area may receive user input. The user input may be received during display of a first video content portion by the video player display. As set forth above, in some examples, the user input may be provided by a viewer of a video game content that is not a player of the video game. In some examples, the user input may include a variety of inputs, such as to add, remove and/or modify resources and player inventories in the video game, to add, remove and/or modify appearances and functionalities of objects in the game, to raise or lower difficulty and skill levels, to modify rules, to add, remove, and/or modify tasks and story lines, to add and remove characters, to modify character appearance, ability, strength, health, and other characteristics, to add, remove, and/or modify obstructions to character movement in the video game, to add, remove, and/or modify locations, weather, seasons, geography, and many other inputs. In some examples, these inputs may be provided in a variety of ways, such as by voting in polls, purchasing or winning rights to provide the input, and through other means.

At operation 1414, a first time associated with generation of the first video content portion is determined. For example, the first time may be a time at which the first video content portion was generated by a video game. This may include a time at which the video game rendered the first video content portion and/or generated state data for rendering the first video content portion. In some examples, operation 1414 may include operations 1416 and 1418. In particular, at operation 1416, a first timestamp assigned to the first video content portion is identified. For example, as described above, an additional content area may allow a viewer to request that an obstruction (e.g., fence, ditch, minefield, etc) be placed adjacent to a location that is currently being shown in the video player display. For example, consider a scenario in which a viewer wishes to create an obstruction adjacent to first base, such as to obstruct and delay runners in the area of first base. In some examples, the viewer may provide user input to create such an obstruction while the video player display is showing an image of a runner at first base (e.g., at time 019 as indicated in the middle row of combined content display time column 1005 of FIG. 12). In this example, as indicated in the middle row of video content timestamp column 1002, the timestamp 009 is assigned to the portion of video content that is displayed at time 019. As set forth above, in some examples, the video player may continually monitor timestamps assigned to incoming portions of video content and provide indications of these timestamps to the additional content area. In some examples, the additional content area may use this video content timestamp information from the video player to identify the first timestamp assigned to the first video content portion at operation 1416. At operation 1418, the first time may be determined based, at least in part, on the first timestamp assigned to the first video content portion. For example, in some cases, the first time may be determined to be the time indicated by the first timestamp assigned to the first video content portion.

At operation 1420, the user input and an indication that the user input is associated with the first time are provided to a recipient, such as a video game from which the video content is captured. In some examples, as shown in FIG. 11, user input 1101 and timing information 1102 may be provided from the additional content area 112 to the game server 910. For example, as described above, in the scenario in which a viewer wishes to generate an obstruction adjacent to first base, the timing information 1102 may include the timestamp (e.g., timestamp 009) assigned to the portion of video content that shows the runner at first base and that may be identified at operation 1416. This timing information (e.g., timestamp 009) may then be provided to the game server 910 and used by the game server 910 to determine that the requested obstruction should be generated adjacent to first base (e.g., at the location associated with the timestamp 009) as opposed to second base (e.g., the current game state location).

Figure 15:
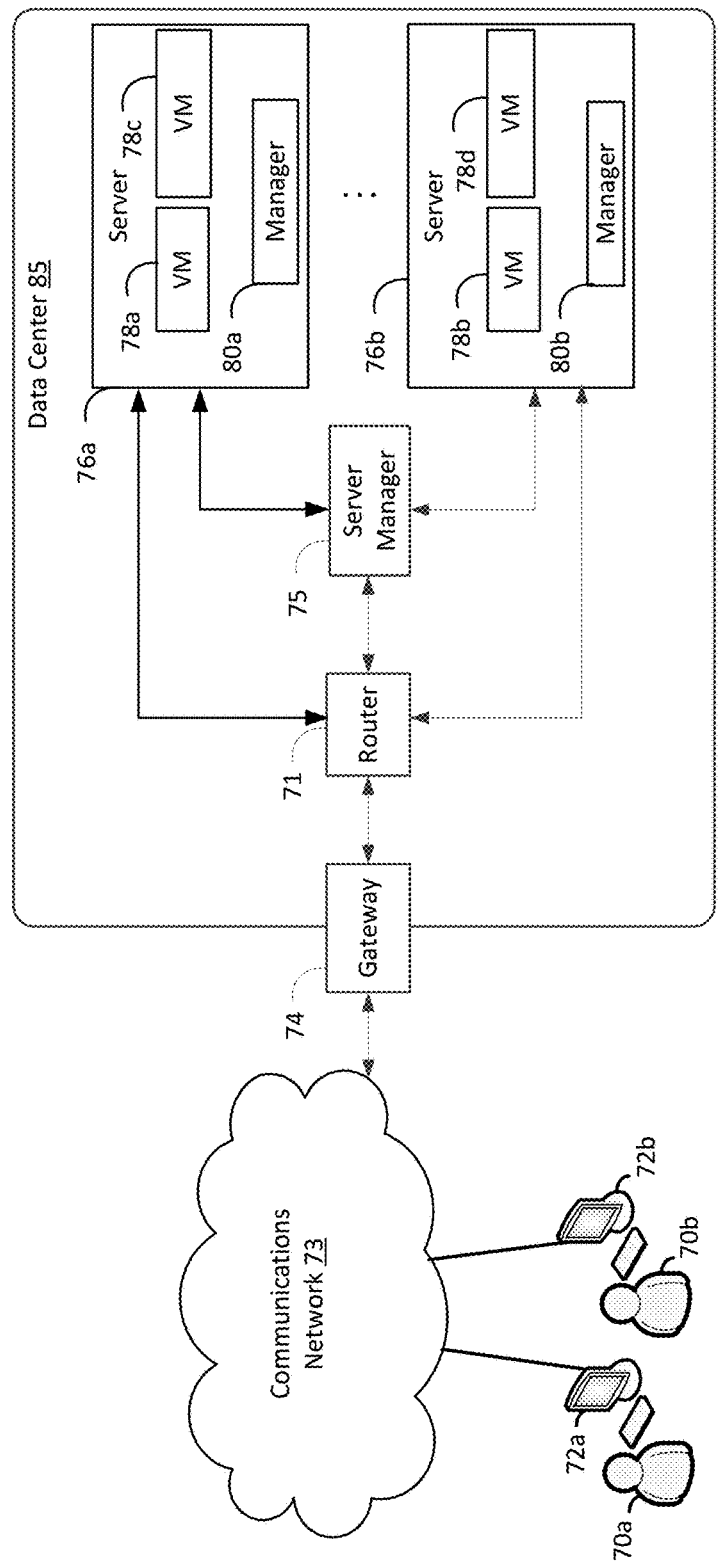
FIG. 15 is a diagram illustrating an example system for transmitting and providing data that may be used in accordance with the present disclosure.

An example system for transmitting and providing data will now be described in detail. In particular, FIG. 15 illustrates an example computing environment in which the embodiments described herein may be implemented. FIG. 15 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 15, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 15 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 15, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 15, a server manager 75 is also employed to at least in part direct various communications to, from and/or between servers 76a and 76b. While FIG. 15 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 15 has been greatly simplified and that many more networks and networking devices may be utilized to interconnect the various computing systems disclosed herein. These network topologies and devices should be apparent to those skilled in the art.

It should also be appreciated that data center 85 described in FIG. 15 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 16:
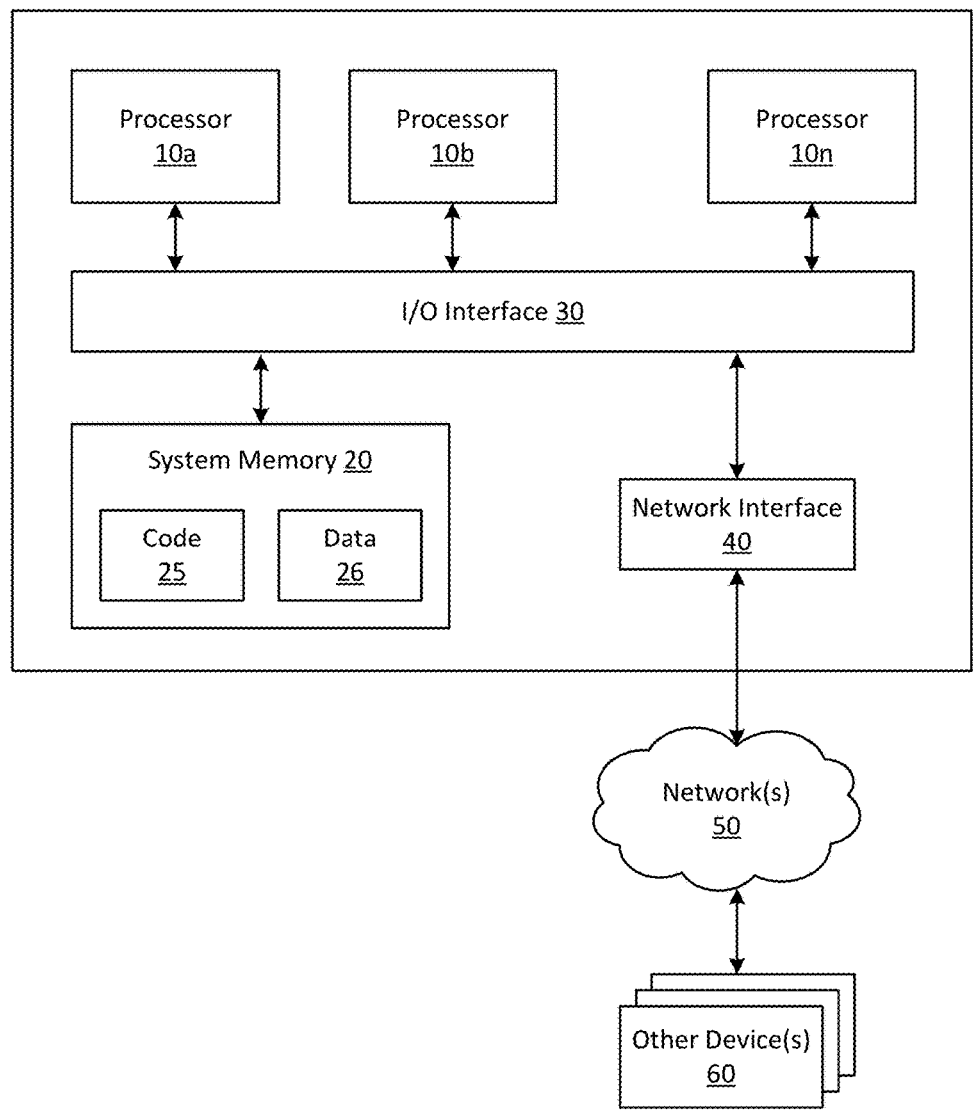
FIG. 16 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 16 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for associating video content and additional content comprising:
one or more processors; and
one or more memories having stored therein instructions that, upon execution by the one or more processors, cause the computing system perform operations comprising:
providing an interface displayed at a first compute node and including a video player display and an inline frame, wherein the video player display displays the video content including a plurality of video content portions that are displayed at different times with respect to one another, wherein the inline frame displays the additional content including a plurality of additional content portions that are displayed at different times with respect to one another, wherein a first video content portion of the plurality of video content portions is related to a first additional content portion of the plurality of additional content portions, wherein the first compute node receives the first additional content portion prior to receiving the first video content portion, and wherein the video content is generated by a video game, displayed on a second compute node operated by a video game player, captured from the second compute node, and transmitted to the first compute node;
determining a first time associated with playing of the first video content portion by the video player display, wherein the first additional content portion is assigned a first timestamp and the first video content portion is assigned a second timestamp that matches the first timestamp, wherein the first timestamp and the second timestamp have a same timestamp value that indicates a second time at which state data is generated, and wherein the state data generated at the second time indicated by the same timestamp value is transmitted from a video game server to the second compute node and used by the second compute node to render the first video content portion for transmission to the first compute node; and
providing instructions to display the first additional content portion in the inline frame at the first time.

2. The computing system of claim 1, wherein the determining comprises:
identifying that the first timestamp is assigned to the first additional content portion;
monitoring the video content to determine a receipt of the second timestamp that matches the first timestamp; and
determining the first time based, at least in part, on the receipt of the second timestamp.

3. A computer-implemented method for associating video content and additional content comprising:
providing an interface displayed at a first compute node and including a video player display and a first area, wherein the video player display displays the video content including a plurality of video content portions that are displayed at different times with respect to one another, wherein the first area displays the additional content including a plurality of additional content portions that are displayed at different times with respect to one another, wherein a first video content portion of the plurality of video content portions is related to a first additional content portion of the plurality of additional content portions, wherein the first compute node receives the first additional content portion prior to receiving the first video content portion, and wherein the video content is generated by a video game, displayed on a second compute node operated by a video game player, captured from the second compute node, and transmitted to the first compute node;

determining a first time associated with playing of the first video content portion by the video player display, wherein the first additional content portion is assigned a first timestamp and the first video content portion is assigned a second timestamp that matches the first timestamp, wherein the first timestamp and the second timestamp have a same timestamp value that indicates a second time at which state data is generated, and wherein the state data generated at the second time indicated by the same timestamp value is transmitted from a video game server to the second compute node and used by the second compute node to render the first video content portion for transmission to the first compute node; and providing instructions to display the first additional content portion in the first area at the first time.

4. The computer-implemented method of claim 3, wherein the first area is an inline frame.

5. The computer-implemented method of claim 3, wherein the determining comprises:
identifying that the first timestamp is assigned to the first additional content portion;
monitoring the video content to determine a receipt of the second timestamp that matches the first timestamp; and
determining the first time based, at least in part, on the receipt of the second timestamp.

6. The computer-implemented method of claim 5, wherein display of the first additional content portion is delayed until display of the first video content portion.

7. The computer-implemented method of claim 3, wherein the additional content includes commentary that describes the video content.

8. The computer-implemented method of claim 3, wherein delivery times for the video content vary during transmission.

9. A computer-implemented method for providing video content comprising:
providing an interface displayed at a first compute node and including a video player display and a first area, wherein the video player display displays the video content including a plurality of video content portions that are displayed at different times with respect to one another, wherein the first area displays additional content including a plurality of additional content portions that are displayed at different times with respect to one another, and wherein the video content is generated by a video game, displayed on a second compute node operated by a video game player, captured from the second compute node, and transmitted to the first compute node; and
transmitting a first video content portion of the plurality of video content portions to the first compute node, wherein the first video content portion is related to a first additional content portion of the plurality of additional content portions, wherein the first compute node receives the first additional content portion prior to receiving the first video content portion, wherein a first time associated with playing of the first video content portion by the video player display is determined, wherein the first additional content portion is displayed in the first area at the first time, wherein the first additional content portion is assigned a first timestamp and the first video content portion is assigned a second timestamp that matches the first timestamp, wherein the first timestamp and the second timestamp have a same timestamp value that indicates a second time at which state data is generated, and wherein the state data generated at the second time indicated by the same timestamp value is transmitted from a video game server to the second compute node and used by the second compute node to render the first video content portion for transmission to the first compute node.

10. The computer-implemented method of claim 9, wherein the first area is an inline frame.

11. The computer-implemented method of claim 9, wherein the first time is determined at least by:
identifying that the first timestamp is assigned to the first additional content portion;
monitoring the video content to determine a receipt of the second timestamp that matches the first timestamp; and
determining the first time based, at least in part, on the receipt of the second timestamp.

12. The computer-implemented method of claim 9, wherein display of the first additional content portion is delayed until display of the first video content portion.

13. The computer-implemented method of claim 9, wherein the additional content includes commentary that describes the video content.

14. The computer-implemented method of claim 9, wherein delivery times for the video content vary during transmission.

15. The computing system of claim 1, wherein display of the first additional content portion is delayed until display of the first video content portion.

16. The computing system of claim 1, wherein the additional content includes commentary that describes the video content.

17. The computing system of claim 1, wherein delivery times for the video content vary during transmission.

18. The computing system of claim 1, wherein delivery times for the additional content vary during transmission.

19. The computer-implemented method of claim 3, wherein delivery times for the additional content vary during transmission.

20. The computer-implemented method of claim 9, wherein delivery times for the additional content vary during transmission.

* * * * *